(12) United States Patent
Temple et al.

(10) Patent No.: US 12,118,571 B2
(45) Date of Patent: *Oct. 15, 2024

(54) SYSTEM AND PROCESS FOR DIGITAL CERTIFICATION OF PRE-OWNED VEHICLES AND EQUIPMENT

(71) Applicant: FMReps Consulting Enterprises, LLC, Palm Beach Gardens, FL (US)

(72) Inventors: Jeffrey Temple, Palm Beach Gardens, FL (US); Jacob Branham, Palm Beach Gardens, FL (US)

(73) Assignee: FMREPS CONSULTING ENTERPRISES, LLC, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,373

(22) Filed: Sep. 19, 2022

(65) Prior Publication Data

US 2023/0019124 A1 Jan. 19, 2023

Related U.S. Application Data

(63) Continuation of application No. 15/966,837, filed on Apr. 30, 2018, now Pat. No. 11,461,789.
(Continued)

(51) Int. Cl.
*G06Q 30/02* (2023.01)
*G06F 3/04817* (2022.01)
(Continued)

(52) U.S. Cl.
CPC ....... *G06Q 30/018* (2013.01); *G06F 3/04817* (2013.01); *G06F 3/0482* (2013.01);
(Continued)

(58) Field of Classification Search
None
See application file for complete search history.

(56) References Cited

U.S. PATENT DOCUMENTS

| 6,070,155 A | 5/2000 | Cherrington | G01M 15/05 345/173 |
| 7,818,105 B2 | 10/2010 | Tsubota | G06Q 10/06 701/29.1 |

(Continued)

OTHER PUBLICATIONS

How Car Companies Inspect Vehicles for Certified Pre-Owned programs, J.D. Power, Christian Wardlaw, Feb. 2017 (Year: 2017).
U.S. Appl. No. 15/966,837, filed Apr. 30, 2018.

*Primary Examiner* — Dennis W Ruhl
(74) *Attorney, Agent, or Firm* — MaxGoLaw PLLC

(57) ABSTRACT

An automated method for certifying pre-owned vehicles is provided including providing a graphical user interface (GUI) on a computing device to a set of stakeholders; generating a login page on a display of the computing device; receiving a stakeholders credentials for login; receiving a vehicle identification number (VIN); checking the VIN against a database of vehicles for eligibility of the vehicle to participate in a certified pre-owned program; sending the VIN to one or more vehicle history reporting agencies; receiving a vehicle history report (VHR) related to the VIN; providing the VHR to a user for review; determining the eligibility of the vehicle based on the user review of the VHR; generating on screen inspection forms based on the VIN; receiving user generated responses to the inspection forms; and generating a digital certification based on the generated responses that conform to preprogrammed guidelines or standards of the certified pre-owned program.

22 Claims, 29 Drawing Sheets

Related U.S. Application Data

(60) Provisional application No. 62/491,875, filed on Apr. 28, 2017.

(51) Int. Cl.
    *G06F 3/0482* (2013.01)
    *G06F 21/31* (2013.01)
    *G06Q 10/10* (2023.01)
    *G06Q 10/20* (2023.01)
    *G06Q 30/018* (2023.01)

(52) U.S. Cl.
    CPC ............ *G06F 21/31* (2013.01); *G06Q 10/10* (2013.01); *G06Q 10/20* (2013.01); *G06Q 30/0278* (2013.01)

(56) References Cited

U.S. PATENT DOCUMENTS

| | | | |
|---|---|---|---|
| 11,461,789 B2 * | 10/2022 | Temple | G06Q 30/018 |
| 2003/0111525 A1 | 6/2003 | Sweeney | G06Q 30/06 235/376 |
| 2007/0179860 A1 | 8/2007 | Romero | G06Q 99/00 705/14.51 |
| 2008/0288346 A1 | 11/2008 | Shames | G06Q 30/0222 705/14.23 |
| 2013/0006809 A1 | 1/2013 | Hollenshead | G06Q 30/06 705/26.41 |
| 2013/0332004 A1 | 12/2013 | Gompert | G07C 5/02 701/1 |
| 2014/0201834 A1 | 7/2014 | Conforti | G06F 21/36 726/19 |
| 2014/0279868 A1 | 9/2014 | Astorg | G06Q 30/02 707/741 |
| 2014/0289075 A1 | 9/2014 | Eager | G06Q 30/0631 705/26.41 |
| 2015/0227942 A1 | 8/2015 | Sidman | G06Q 30/018 705/7.31 |
| 2016/0174072 A1 | 6/2016 | Allyn | H04W 12/06 455/411 |

* cited by examiner

SYSTEM AND PROCESS FOR DIGITAL CERTIFICATION OF PRE-OWNED VEHICLES AND EQUIPMENT

CROSS-REFERENCE TO RELATED APPLICATION

This application is a continuation of U.S. patent application Ser. No. 15/966,837 filed Apr. 30, 2018; now U.S. Pat. No. 11,461,789 B1, that in turn claims priority of U.S. Provisional Patent Application Ser. No. 62/491,875 filed Apr. 28, 2017, which is incorporated herein by reference.

FIELD OF THE INVENTION

The present invention in general relates to a system and method for used equipment retailing and sales; and in particular to an automated interactive system and method for certifying pre-owned vehicles and equipment for resale.

BACKGROUND OF THE INVENTION

A certified pre-owned (CPO) car is a particular type of used car. Certified pre-owned vehicles are most often late-model low mileage cars or trucks that differ from other used vehicles by having been inspected, refurbished, and certified by a manufacturer, dealer, or other certifying authority. Therefore, all CPO vehicles must pass a detailed inspection, outlined by the manufacturer. Most certified inspections are similar, but the number of inspection points covered on the vehicle can vary based on the manufacturer's definitions. The number of items in the inspection list help indicate the thoroughness of the inspection and whether any repairs or maintenance work were required to bring the vehicle up to CPO condition.

Therefore, unlike a used vehicle, a CPO vehicle comes with a complete inspection that repairs any damaged or worn parts before being offered for sale. In order to get this same service when buying a used vehicle, the buyer must pay for an inspection and usually any subsequent repairs.

CPO vehicles also typically include an extended warranty, special financing, and additional benefits illustratively including free roadside assistance, free shuttles or loaner cars when a car is being serviced, and basic scheduled vehicle maintenance. The extended warranty for a CPO vehicle is a manufacturer-backed certified pre-owned (CPO) warranty. A CPO extended warranty differs from or an aftermarket extended warranty, which is usually a third-party warranty sold by dealers to drivers who buy used cars that don't include a manufacturer warranty, in that an extended warranty is typically in addition to a car's price, while a CPO warranty is included in the car's pricing. CPO warranties come in a simple, one-size-fits-all package, while extended warranties do not. For example, a single brand of certified pre-owned vehicles may offer 3 years or 100,000 miles of coverage, regardless of age or model. That isn't necessary true of extended warranties, which are often available for varying lengths of time and cover only specific parts of the vehicle.

The option of buying certified pre-owned vehicles has been gaining popularity, particularly for more expensive vehicles that shoppers might not have been able to afford when new. Although the luxury brands are the most popular certified cars, a lower price is a benefit for any CPO vehicle, since the value of a vehicle depreciates more during its first year than in any other.

Certified used car programs began appearing in the early 1990s as customers returned an increasing number of leased vehicles that were in good mechanical condition, usually with fewer than 40,000 miles on the odometer. Typically, dealerships put the best of these returned vehicles on sale and sent the rest to auction, where used car dealers bought them and then sold them to the public.

With the aforementioned increase in the number of certified buyers that has grown steadily in recent years, nearly every automotive manufacturer now has a CPO program in place. Buyers find the process of buying a CPO easier than shopping for a used car. This is because the certification process removes one of the major drawbacks to buying a used car: uncertainty about the mechanical condition of the vehicle. A factory-trained mechanic inspects a potential CPO car to ensure it measures up to the requirements of that manufacturer's program. The dealership that's performing the certification replaces or repairs anything that's worn beyond the limits of that manufacturer's program.

Automotive manufacturers have found CPO programs to be a very effective marketing tool that builds brand loyalty. Certified pre-owned (CPO) program vehicles typically offer higher sale margins than non-certified used vehicles and can serve as a gateway to long-term loyalty from a customer. A CPO program can help protect vehicle residual values for continued competitive lease and annual percentage rate (APR) programs. A CPO program offers selling dealers sales benefits, a closed network for repairs, and can support revenue in finance and insurance (F&I) offices. Furthermore, 49% of CPO customers trade up to a new vehicle from the same brand (Autotrader.com 2014) within 30 months of the initial CPO purchase. Plus, a CPO program helps sustain the brand's overall value, which translates into greater revenue for a brands affiliated dealerships. CPO vehicles typically sell 28 days faster than their non-certified counterparts (AutoTrader 2011—Certified Pre-Owned National Averages).

While certified pre-owned vehicle programs offer manufacturers, dealers, and consumers many benefits vehicle inspection and certification can be a delicate and error prone process with more than 70% of dealer infractions being due to documentation issues. The reliability and trustworthiness of a certification program is key to the success of CPO sales for manufacturers and dealers. Thus, there continues to be a need for an improved system of integrated suites of software tools that may be accessed and employed across all hardware platforms for implementation of a certified pre-owned vehicle program that minimizes clerical and reporting errors while providing accurate real-time information and records to stakeholders in the certification process.

SUMMARY OF THE INVENTION

A non-transitory computer-readable medium for certifying pre-owned vehicles is provided. The non-transitory computer-readable medium includes instructions stored thereon, that when executed on a processor, generate a graphical user interface (GUI); receive a vehicle identification number (VIN); check the VIN against a database of vehicles for eligibility of the vehicle to participate in a certified pre-owned program; send the VIN to one or more vehicle history reporting agencies; receive a vehicle history report (VHR) related to the VIN; provide the VHR to a user for review; determine the eligibility of the vehicle based on the user review of the VHR; generate on screen inspection forms based on the VIN; receive user generated responses to the inspection forms; and generate a digital certification based on the generated responses that conform to preprogrammed guidelines or standards of the certified pre-owned program.

An automated method for certifying pre-owned vehicles is also provided. The automated method for certifying pre-owned vehicles includes providing a graphical user interface (GUI) on a portable computing device to a set of stakeholders; generating a login page on a display of the portable computing device; receiving a stakeholders credentials for login; receiving a vehicle identification number (VIN); checking the VIN against a database of vehicles for eligibility of the vehicle to participate in a certified pre-owned program; sending the VIN to one or more vehicle history reporting agencies; receiving a vehicle history report (VHR) related to the VIN; providing the VHR to a user for review; determining the eligibility of the vehicle based on the user review of the VHR; generating on screen inspection forms based on the VIN; receiving user generated responses to the inspection forms; and generating a digital certification based on the generated responses that conform to preprogrammed guidelines or standards of the certified pre-owned program.

A system for certifying pre-owned vehicles is further provided. The system for certifying pre-owned vehicles includes a server with a database connected via a network to one or more portable computing devices located at vehicle dealer locations. A memory system is in electrical communication with the server containing a machine-readable medium having stored thereon one or more sequences of instructions. When the one of more sequences of instructions are executed by a processor, a method for certifying pre-owned vehicles is carried out. The method for certifying pre-owned vehicles includes providing a graphical user interface (GUI) on a portable computing device to a set of stakeholders; generating a login page on a display of the portable computing device; receiving a stakeholders credentials for login; receiving a vehicle identification number (VIN); checking the VIN against a database of vehicles for eligibility of the vehicle to participate in a certified pre-owned program; sending the VIN to one or more vehicle history reporting agencies; receiving a vehicle history report (VHR) related to the VIN; providing the VHR to a user for review; determining the eligibility of the vehicle based on the user review of the VHR; generating on screen inspection forms based on the VIN; receiving user generated responses to the inspection forms; and generating a digital certification based on the generated responses that conform to preprogrammed guidelines or standards of the certified pre-owned program.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings, where like numbers in the different drawings have the same meaning, in which:

DESCRIPTION OF THE INVENTION

Figure 1:
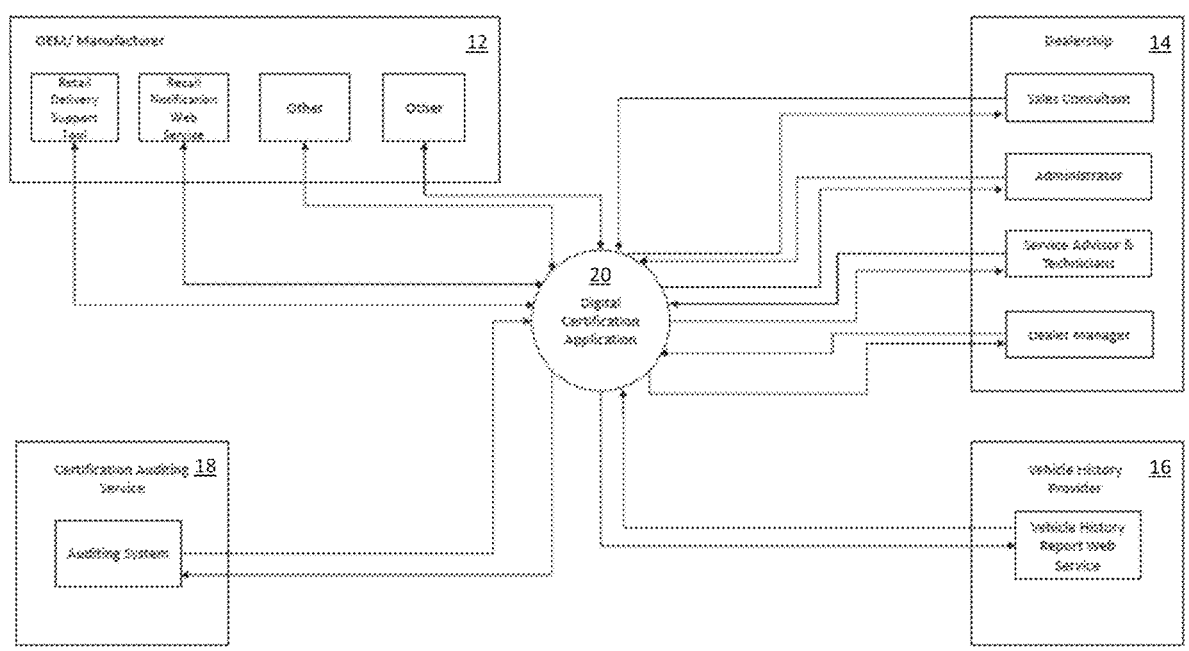
FIG. 1 shows a digital certification application environment diagram according to one embodiment of the present invention.
Figure 2A:
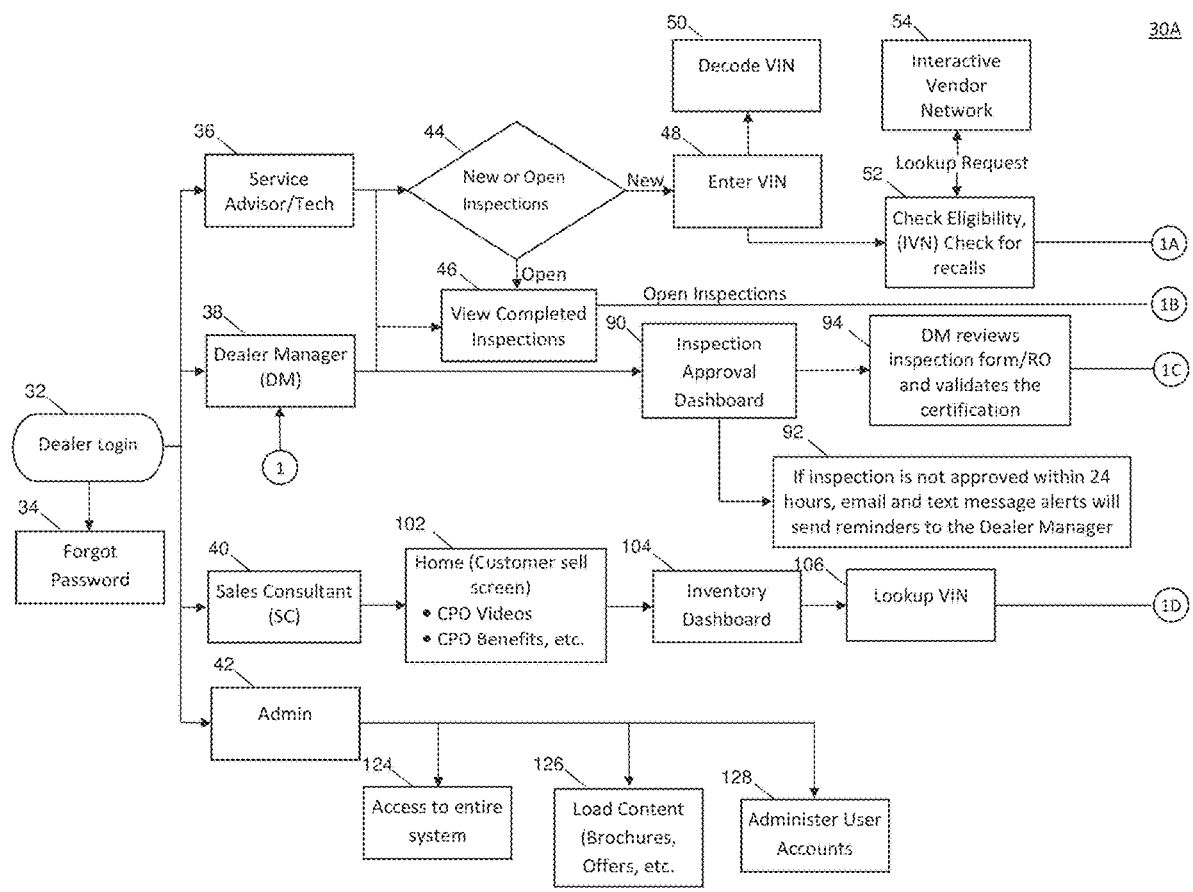
FIGS. 2A-2D illustrate a flowchart of the operation of the system platform during vehicle certification from the dealer perspective in accordance with embodiments of the invention.
Figure 2B:
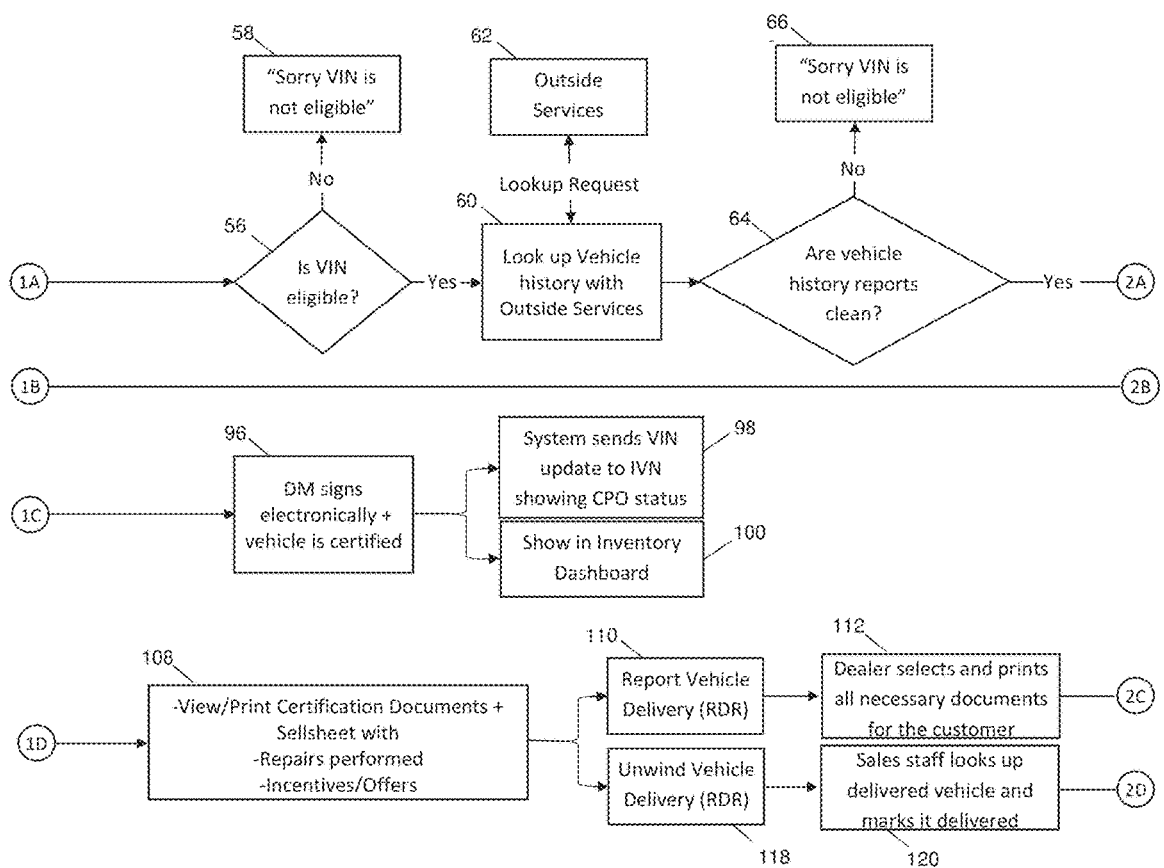
Figure 2C:
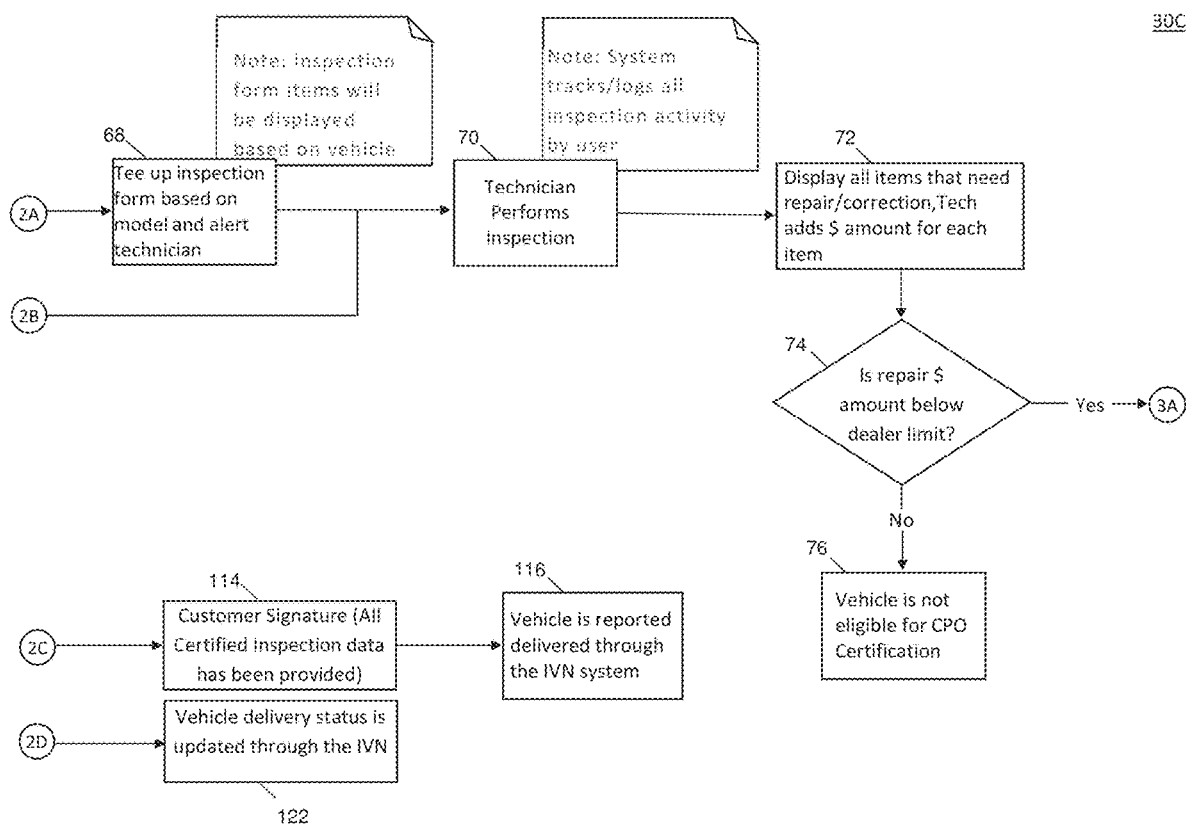
Figure 2D:
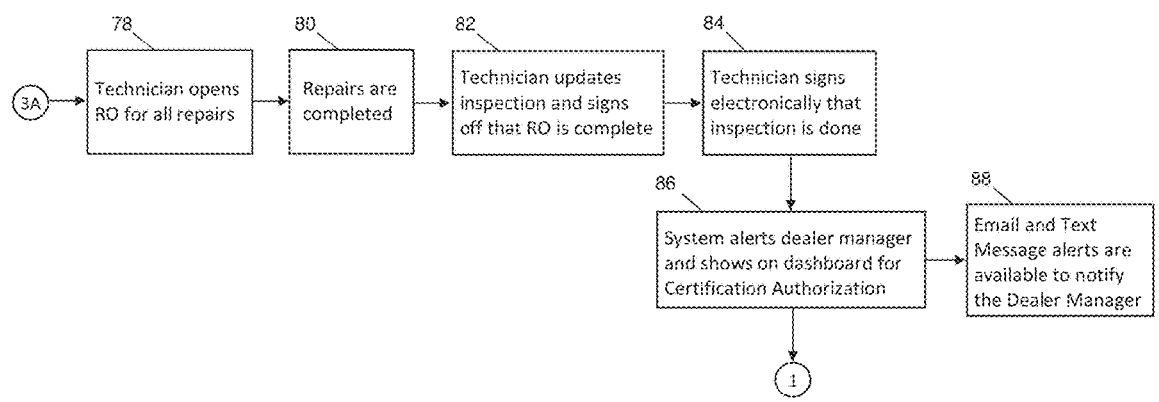

The present invention has utility as an automated system and method for certification of pre-owned vehicles and equipment in the context of certified pre-owned (CPO) programs. In a specific embodiment a system and process for digital certification of used vehicles is provided. Embodiments of the invention provide a complete suite of applications (apps) for real-time state of the art management, user input, vehicle and equipment tracking, and reporting via networked computer systems and cloud-based mobile devices for original equipment manufacturers (OEM), dealers, independent auditors, compliance partners, and other stakeholders. Embodiments of the inventive tool for implementing CPO programs are designed for mobile phone and tablet computer platforms on the iOS and Android operating systems as well as traditional desktops and laptops running Windows, Apple OSX, and Chrome OS. The system includes a program application (app), secure data warehousing, and real-time information availability. The suite of cloud based or networked based apps of embodiments of the invention include a dealer portal, a corporate reporting website, and an auditing and compliance portal.

Embodiments of the inventive platform for CPO programs provide an integrated approach to document handling and data input and recording that minimizes clerical errors during a certification process that can potentially jeopardize the reputation of a certification program, and maintains the integrity of the certification documents across different stages/periods of time. Embodiments of the inventive platform provide OEM, dealers, independent auditors and compliance partners, and other stakeholders with instant access to available inventory and to all the pertinent records for a pre-owned vehicle or piece of equipment, and provides a clear snapshot of the entire process as well as provide dealers with current promotions, sales materials, media, and important CPO forms. Furthermore, embodiments of the inventive platform may be integrated into existing user certified pre-owned associate training, dealer standards, certification programs, and incentive programs.

Among the features provided by embodiments of the inventive platform for CPO programs to streamline the certification and inspection process and eliminate clerical errors include providing inspection forms that auto-populate only with the items specific to a particular vehicle identification number (VIN) or other equipment identifier so as to avoid wasted time and potential for errors checking off items that don't apply to that vehicle. Immediate notification is provided if a vehicle or piece of equipment isn't qualified to be certified, nor can the vehicle or equipment be certified at a later date, including flagging any vehicle or equipment recalls. Vehicle eligibility may be based on year, make, model, and mileage which are verified upfront to quickly let the user know if that vehicle is qualified to be certified. Embodiments of the inventive platform are able to integrate with all required third party systems to compile and store all the required information by VIN. VIN status inquiries and vehicle history reports (VHR) from major independent agencies are available through a portal of the graphical user interface (GUI) of the platform.

Complete checklists are provided via the GUI based on the requirements of the certification program. Versions of inspection checklists are updated throughout the inspection, certification, and sales process, where the entire checklist is populated in embodiments of the system allowing systematic check-offs of all items pertinent to that specific VIN. The GUI of the platform will not allow user to move on to the next section of an inspection or certification form until the prior section is complete. In specific embodiments the GUI generates on screen prompts and other GUI features that are touch activated via a touchscreen of a computing device. The inventive platform tracks and time-stamps the activity of the vehicle or equipment throughout the process, allowing management at the dealer and/or manufacturer/corporate level to see how long the certification process is taking (for turn and velocity metrics), where the vehicle is in the process, and for creating a record of who exactly worked on the vehicle during the inspection process for audit purposes. Post-sale checklists/requirements are also provided by embodiments of the platform.

Embodiments of the inventive platform are configured to track the requisition orders (R/0) for repairs that were made to each particular vehicle by year, make, and model to look at trends and occurrences, and stores inspection documentation along with all additional forms/information for future reference. The system captures reconditioning repair order numbers and identifies technician(s) that confirm reconditioning was performed on a vehicle or equipment. The platform may capture repair orders from a dealer management system (DMS) and the responsible technician(s). The platform also identifies dealer management that confirmed that an inspection and reconditioning was performed. The inventive system records signatures of all parties involved in the inspection as well as dealer management that performs final sign-offs. Dealers may also set repair amount thresholds. A camera function is provided for uploading of photos during an inspection that may be saved with the inspection to assist with any audits. The camera function is also used to scan a VIN when starting an inspection The inventive platform provides a corporate dashboard for tracking and reporting by zone, state, dealer, etc., and the dashboard may be customized to prepare various reports management requires. Furthermore, corporate level controls track eligible dealers, and if a dealer is deemed ineligible, the dealer is suspended from certifying future vehicles and vehicles may be un-certified.

Embodiments of the inventive platform allow a dealer to perform retail delivery registration (RDR) and unwinds of a vehicle. RDR's and unwinds may be completed through the normal dealer process through the corporate network. The platform provides a link out to the corporate network to perform these processes using an OEM's existing RDR system.

Alternatively, embodiments of the platform are configured to perform the entire RDR process. The dealers will also be able to look up the delivered vehicles, select the correct VIN and simply click a button to unwind the vehicle. Once that button is checked, there will be a required signature for authorization. The consumer is able to sign off on the inspection before the vehicle can be registered for retail delivery registration (RDR). A check-list is provided to make sure the dealer gives the customer all the required items—key fobs, letters, copies of inspection forms, etc. A section is provided for customer review of documents being provided and acknowledgement signatures that items promised were delivered with date stamps. All pertinent documents are stored in one file that a salesperson logs into, and enters a VIN or looks for the vehicle by year, make, model to access the documentation for the particular vehicle that a customer may review and signoff on. The signoff is part of a confirmation facility that may be provided for digital signatures for managers, service technicians and consumers at vehicle delivery further creating a value story to the customer, knowing that the consumer can purchase the CPO vehicle with confidence. The documents may be printed or emailed to a customer that may include a vehicle history report (VHR), inspection checklist, welcome letter or confirmation of purchase, manuals, and warranty.

The platform portal for independent auditors and compliance inspectors provides access and/or export certification documents. The inspection portal allows access to the electronic files of all vehicles that have passed the inspection process and are approved by a dealer manager.

The suite of cloud-based apps and networked apps are fully designed to work with legacy IT systems. The apps and infrastructure to support these tools are built with the following attributes:

Secure cloud-based application servers
  Stacks that feature real-time data replication, which makes the platform ultra-scalable and reliable
  Use of well-supported open source solutions for unrestricted use of inventive platform from any third-party licensing or support issues
  Support for SaaS based models for smaller customers and an Enterprise model for larger customers
  Web app support for modern desktop and mobile browsers including Chrome, Internet Explorer, Firefox, and Safari
  Native app support for mobile and desktop devices including those operating on the iOS, Android, Windows, Mac OSX, and Chrome OS platforms
  Allows use on mobile devices in non-native mode [Does not require use of app stores for distribution]
  API to integrate features into custom applications
  Feature rich reporting and analytics
  Simple web-based user administration
  Third party integration of the inventive platform with vehicle history reporting agencies, independent auditors, OEM corporate networks, and dealer management system (DMS) integration (third party source).

Embodiments of the inventive app utilize a responsive user interface (UI). Additional aspects and features of the app and UI include:

Secure login
  Built in search capabilities
  Secured access may be provided to authorized users outside the system—information continuity
  UI and app may be customized for client's need and/or private labeled Fast view dashboard shows open and completed certifications Production of action plans The capability of capturing notes/comments Additional capabilities of embodiments of the inventive platform and app include reporting capabilities. A report generator and a statistical analysis module to generate reports is part of the platform.

While several steps performed by an inventive process and a non-transitory system involve one or more abstract ideas, the present invention as a whole includes aspects that amount to significantly more than the abstract idea. Indeed, aspects of the present invention have never been previously performed in manual or digital form prior to the present invention. As recitations of using a non-transitory computer medium to implement an automated system and method for certification of pre-owned vehicles and equipment in the context of certified pre-owned (CPO) programs. In a specific embodiment a system and process for digital certification of used vehicles is provided. These aspects of the present invention as an ordered combination, amount to significantly more than simply organizing and comparing data by addressing the institutional challenges of maintaining the integrity of a certified pre-owned program with an integrated approach to document handling and data input and recording that minimizes clerical errors during a certification process across different stages/periods of time. Embodiments of the inventive platform provide OEM, dealers, independent auditors and compliance partners, and other stakeholders with instant access to available inventory and to all the pertinent records for a pre-owned vehicle or piece of equipment, and provides a clear snapshot of the entire process as well as provide dealers with current promotions, sales materials, media, and important CPO forms. As a result, the present invention streamlines the certification process while improving the integrity of the process in the context of an automated system and method for certifying pre-owned vehicles and equipment. Embodiments of the invention provide a complete suite of applications (apps) for real-time state of the art management, user input, vehicle and equipment tracking, and reporting via networked computer systems and cloud-based mobile devices for original equipment manufacturers (OEM), dealers, independent auditors, compliance partners, and other stakeholders.

Referring now to the figures, FIG. 1 shows a digital certification application environment diagram 10 that shows the parties that provide inputs or access information related to a digital certification application 20. The manufacturer 12 of the equipment or vehicle being certified for resale provides a retail delivery support tool and provides notifications of any recalls related to a vehicle or equipment that may affect the suitability of the equipment or vehicle being certified for resale. The dealership 14 seeking certification of equipment or a vehicle has stakeholders including a sales consultant, an administrator, a service advisor and technicians, and a dealer manager who contribute to the digital certification application 20, or utilize information supplied by the digital certification application 20. A vehicle history report (VHR) provider 16 supplies information based on the VIN about a vehicle being certified by the digital certification application 20, or requests updated information about the vehicle from the application 20. A certification auditing service 18 monitors the digital certification application 20 for the integrity of information about the equipment or vehicles being certified.

FIGS. 2A-2D illustrate a flowchart (30A-30D) of the operation of an embodiment of a system platform during vehicle certification from the dealer perspective. The process starts by accessing the dealer portal via a login screen (block 32) and entering a user ID and password. If the password is incorrect, the user is directed to a forgot password page (block 34). The dealer portal is available to stakeholders including service advisors/technicians (block 36), dealer manager (block 38), sales consultant (block 40), and an administrator (block 42). Continuing from the perspective of the service advisor/technician, the user either starts a new or continues with an open (existing) inspection (decision block 44). For a new inspection a vehicle identification number (VIN) is entered (block 48) and the VIN is decoded (block 50). The VIN is checked automatically by the system to check for eligibility (block 52) in an interactive vendor network (IVN) (block 54), which is a corporate network for the original equipment manufacturer (OEM) that member dealers have access to. If the VIN is not eligible (decision block 56 is No) the user is notified that the vehicle with the entered VIN is not eligible (block 58) for the CPO program. If the VIN is eligible (decision block 56 is Yes) the VIN is automatically submitted to an outside service (block 60) that tracks vehicle histories to obtain the history of the vehicle (VHR) from the outside service (block 62). The vehicle history reports are then analyzed for accidents, flood damage, or title issues that make the vehicle ineligible for the CPO program. If the VHR is not clean (decision block 64 is No) the vehicle with the entered VIN is not eligible (block 66). If the VHR is clean (decision block 66 is Yes) an inspection form is displayed on the user (technician) device or is sent to the technician (block 68). Unlike checking VHR form and preparing inspection forms manually, the inventive system and method prevent wasted time by not allowing access to the prepared inspection forms until all eligibility checks have been properly completed, thereby preventing inspection to begin on a vehicle that is not eligible. The contents of the inspection form are based on the vehicle to be inspected as determined by the VIN, as well as certification program requirements. Accordingly, the inspection forms generate automatically based on the specific vehicle and CPO specific requirements, which has never been performed manually. The technician performs the inspection (block 70). It is noted that the system automatically tracks and logs all inspection activity by the technician including time stamping completed points of inspection. Such automatic tracking has never been accomplished, particularly without increasing the workload of the technician. Based on the inspection results, items that require repair/correction are displayed in a list. According to some embodiments, a dollar amount for the needed repairs is automatically assigned to the repair items. In further embodiments, the list of required repairs is sent to a manager, service, manage, or parts associate who assess and assigns a repair cost to each required repair based on experience. A determination is then made of whether the total dollars amount required for repairing the vehicle is within a dealer limit (decision block 74). If the repair dollars are above the dealer limit (decision block 74 is No) the vehicle is not eligible for the CPO program (block 76) or the vehicle may be eligible for repairs only with the signature and approval of a dealership manager. If the repair dollars are below the dealer limit (decision block 74 is Yes) the technician opens a repair order (RO) on the platform (block 78) and conducts the required repairs (block 80) and updates the RO as the repairs are completed and signs off that the repairs are completed (block 82). The certification checklist report is updated based on the repairs (block 82) and the technician electronically signs the certification checklist report has been completed (block 84) as shown in FIG. 4S. Based on the completed and signed off inspection report the system automatically generates an alert to the dealer manager (DM) that appears on a dashboard (see FIG. 4C) for certification authorization (block 86) and email and/or text may be sent to the dealer manager (block 88). The dealer manager reviews the inspection approval dashboard (block 90) within 24 hours of technician approval, however if more than 24 passes the dealer manager is automatically sent a reminder email and/or text message alert that a vehicle that has passed inspection is awaiting approval (block 92). The dealer manager reviews the inspection form/RO and validates the certification (block 94) and electronically signs (see FIG. 4T) that the vehicle is certified for the CPO program (block 96). The system based on the DM approval sends the VIN of the now certified vehicle to the interactive vendor network (IVN) of the OEM to update available CPO vehicles in a master list of an inventory dashboard (block 100). The automatic updating of the master list provided by the inventive method and system enables CPO vehicles to be listed faster than ever before so the vehicles can be sold faster than ever before.

A sales consultant (SC) who retails certified vehicles uses the inventive portal to access a selling screen with CPO marketing materials (video, benefits of purchase, etc.) (block 102), the current inventory dashboard (block 104) of available CPO vehicles, and a VIN lookup screen (block 106). The sales consultant may use the current inventory dashboard (block 104) to select a vehicle and access information for viewing/printing (block 108) about the selected certified vehicle illustratively including certification documents and a sellsheet that includes repair(s) performed and incentives/offers for the vehicle. In order to complete a vehicle sale, the sales consultant utilizes a report vehicle delivery (RDR) screen (block 110) on the platform to select and print required documents for the customer (block 112) that customer signs (block 114). The customer signature indicates that all certified inspection data has been provided, and the vehicle is reported as delivered through the interactive vendor network (IVN) system (block 116), keeping records up to date in real time, which has never been performed manually. In addition, the vehicle is unwound for delivery (retail delivery registration (RDR)) (block 118) and the sales staff looks up the delivered vehicle and marks the vehicle delivered (block 120) and the vehicle delivery status is automatically updated through the IVN (block 122), keeping records up to date in real time, which has never been performed manually.

An administrator (block 42) has access to the entire platform/system (block 124) and has the ability to load content (block 126) on to the platform illustratively including brochures, offers, etc. In addition, the administrator controls permission levels and access to the system for user accounts (block 128).

Figure 3:
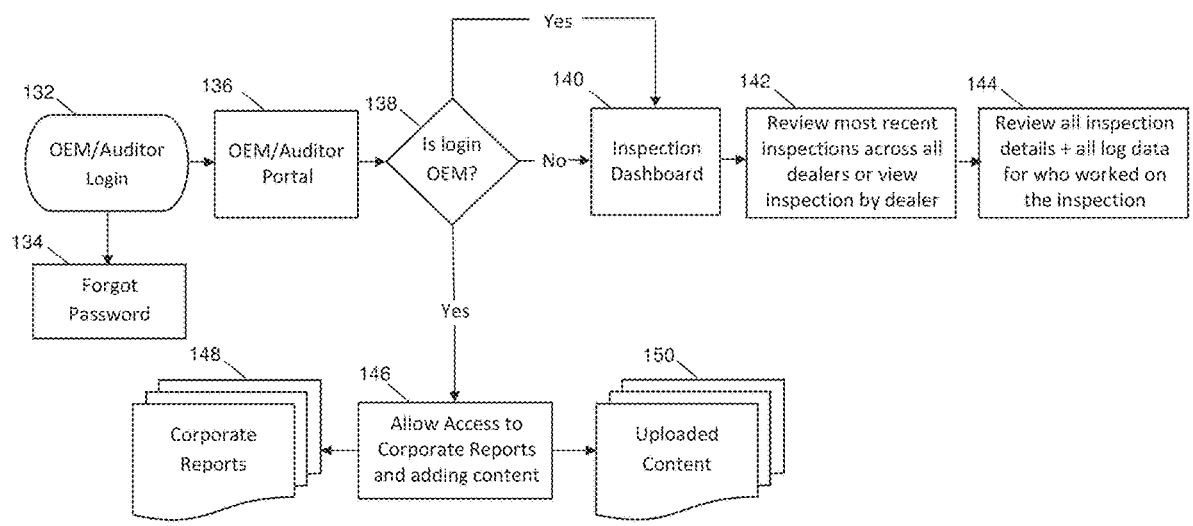
FIG. 3 illustrates a flowchart of the operation of the system platform during vehicle certification from the OEM/Auditor perspective in accordance with embodiments of the invention.

FIG. 3 illustrates a flowchart 130 of the operation of the system platform during vehicle certification from the OEM/Auditor perspective. A login screen (block 132) is provided to personnel at the corporate/OEM level and to independent auditors with a forgot password recovery facility (block 134). Login to embodiments of the platform is conducted through an OEM/auditor portal (block 136) which controls the level and areas of access in the portal. If the user is an OEM user (decision block 138 is Yes) the user is allowed access (block 146) to corporate reports (block 148) and to upload content to the platform (block 150). In addition, the OEM user may access the inspection dash board (block 140) to review the most recent inspections across all dealers or inspections carried out by a specific dealer (block 142). The OEM user may review all inspection details as well as log data for who worked on the inspection (block 144), which was information that was unavailable prior to the inventive system and method. If the user is an auditor (decision block 138 is No) the auditor is only directed to the inspection dashboard (block 140) and is able to review the most recent inspections across all dealers or inspections carried out by a specific dealer (block 142). The auditor user may review all inspection details as well as log data for who worked on the inspection (block 144).

Figure 4A:
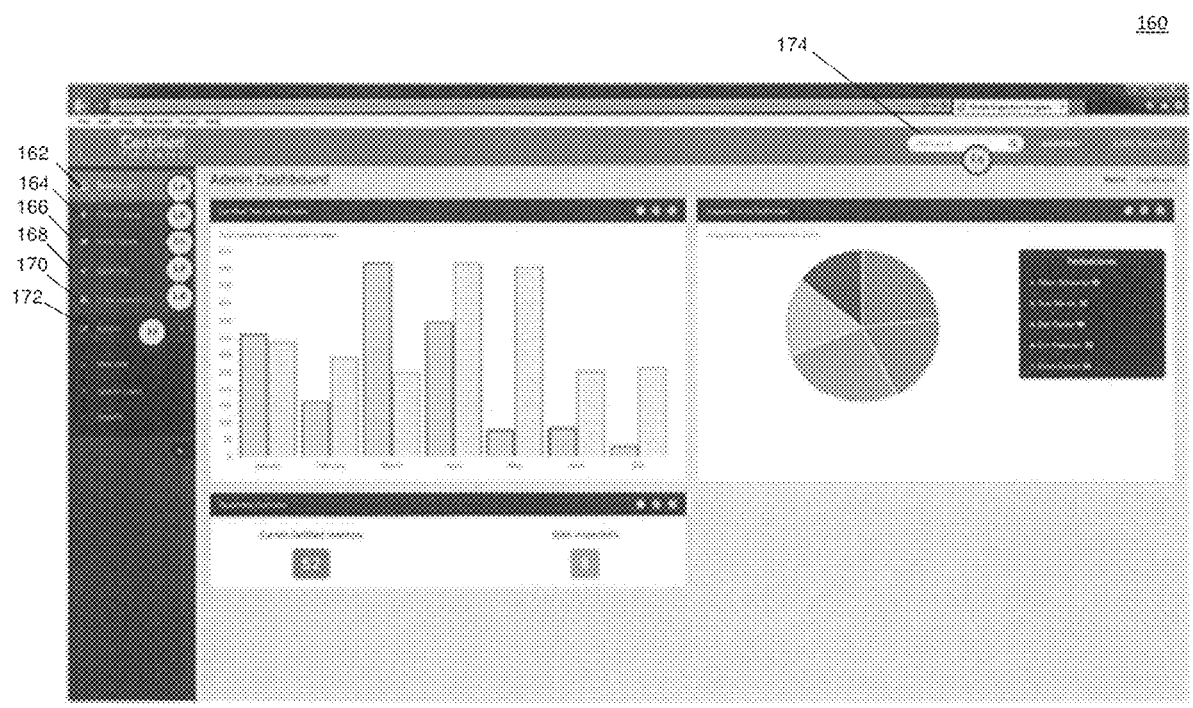
FIGS. 4A-4H are a series of screenshots of a graphical user interface showing the different dealer access levels for implementing features of the system for improving the accuracy and streamlining the pre-owned certification process in accordance with embodiments of the invention.

FIGS. 4A-4H are a series of screenshots of a graphical user interface (GUI) showing the different dealer access levels for implementing features of the system for improving the accuracy and streamlining the pre-owned certification process. FIG. 4A shows a screenshot 160 of the administrative dashboard selected with dashboard tab 162. Administrative access grants a user full access to all functions of the dealer portal through the following tabs. The administrator dashboard (tab 162) contains various graphs that allow the user to view real time information such as the total number of vehicles that have been certified in the current calendar year, the total number of current certified vehicles and the total amount of open inspections not readily available in a manually performed system and method. The create new tab 164 is selected to start the inspection process. The view open tab 166 populates the users screen with all open inspections at the dealership. Selection of the approve tab 168 directs the user to the approve inspection screen. The view inventory tab 170 provides a display of all of the vehicles that have been approved by a service manager. Filters may be used to drill down to specific VINs, models and years. Using a selected VIN, the user may download documentation illustratively including vehicle inspection checklists, vehicle history reports, VIN Inquiry, repairs/costs and content provided by the OEM of the vehicle. In addition, the admin has the ability to search through previously delivered vehicles to unwind an RDR. Selection of the admin tab 172 allows for the addition of new users and is where an admin creates a new account. A search user section is where user information, permissions, and access can be adjusted. A reports section allows the user to run various reports in the system based on the inspection data that is collected. Examples of reports illustratively include, user activity, and inspection repair costs. Admins are also able to upload documentation after a vehicle is certified. The VIN search tab 174 prompts the user to select whether they would like to search for open inspections, inspections waiting on dealer manager approval, or certified inventory. The inventive graphical user interface for the inventive system and method accordingly allows real time access to vast amount of information to multiple users in various locations while ensuring the information is consistent, accurate, and up to date for each user.

Figure 4B:
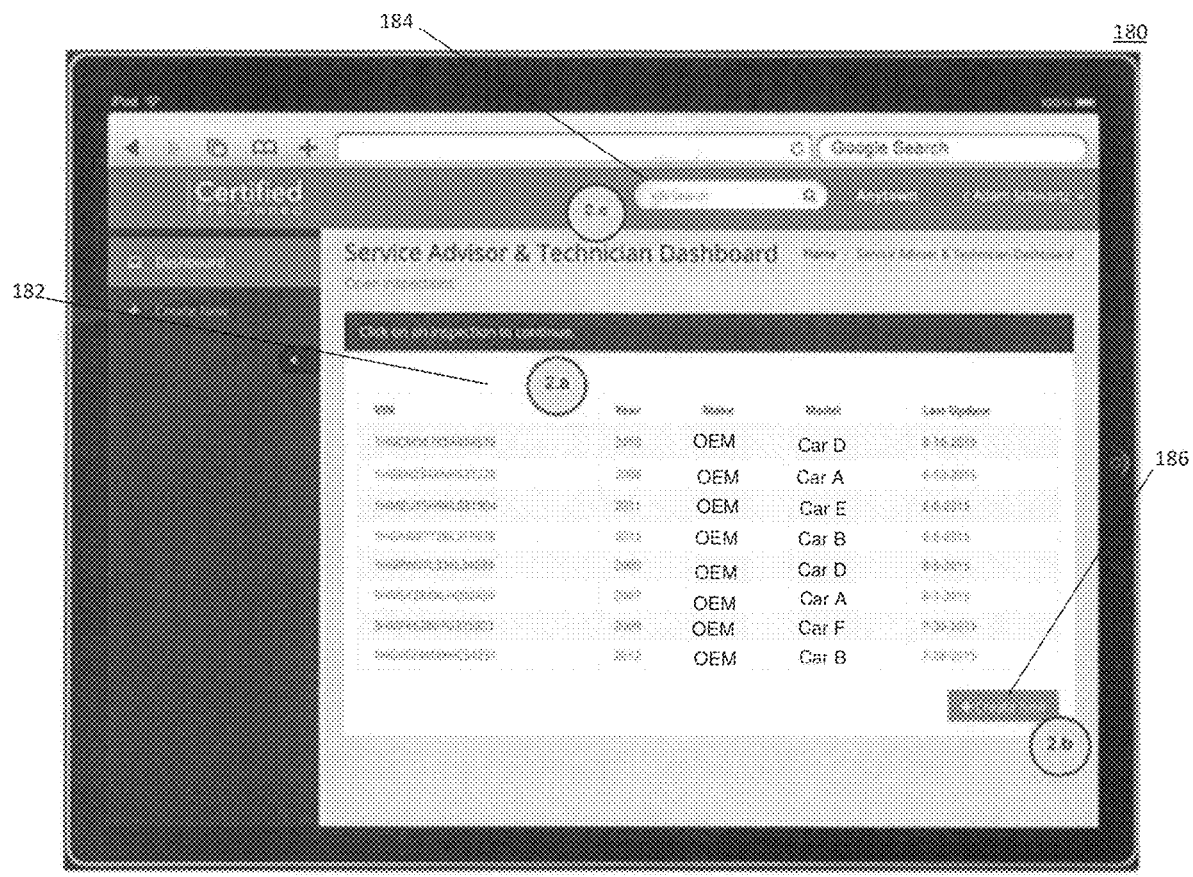

FIG. 4B shows a screenshot 180 of the service advisors and technicians dashboard showing open inspections in a table 182 with fields for VIN, year, make, model, and last update. Users can resume an inspection by clicking on the VIN of the desired vehicle in the table 182. The VIN search input field 184 allows a user to search for a vehicle based on an inputted VIN and will only display results of a VIN that is currently part of an open inspection. The create new button 186 will start a new inspection process.

Figure 4C:
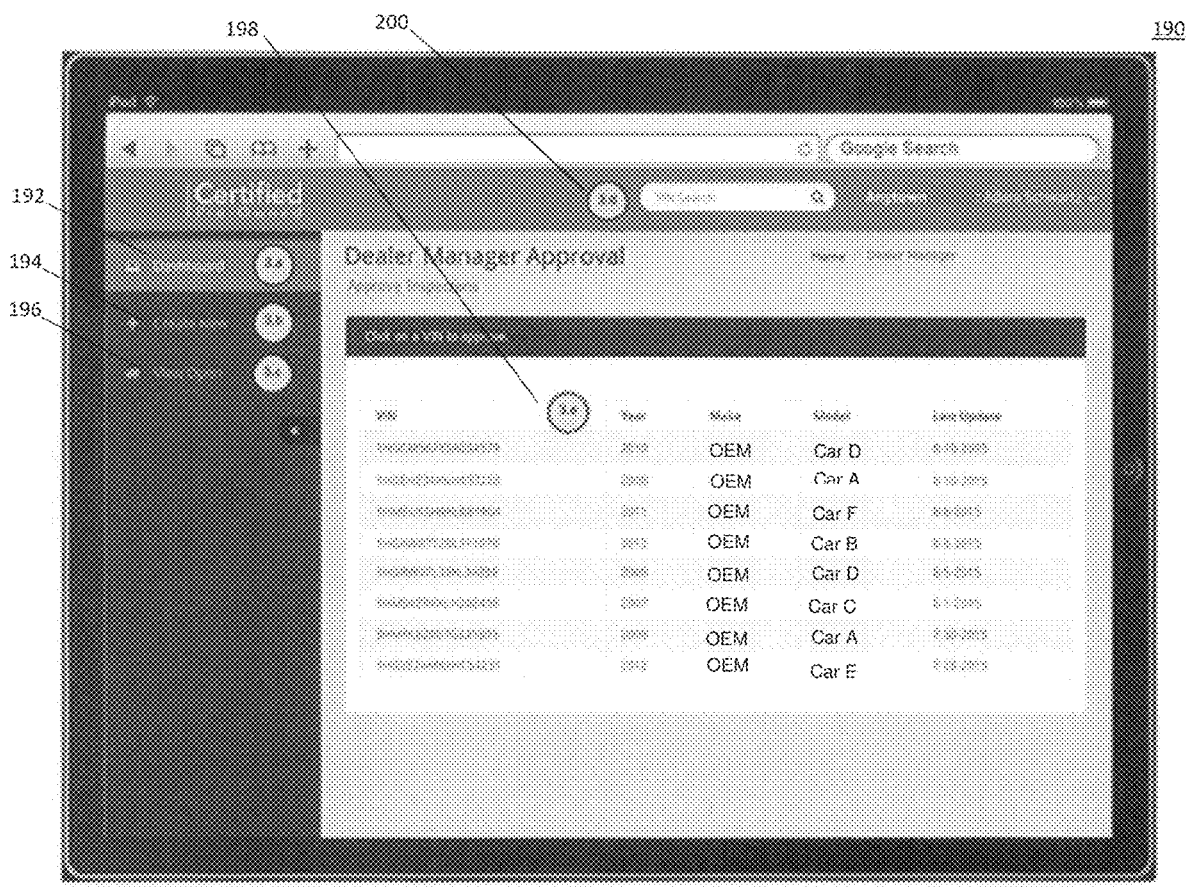

FIG. 4C shows a screenshot 190 of the dealer manager approval dashboard selected with tab 192. The dealer manager dashboard 198 displays all completed inspections that are waiting for dealer manager approval. Clicking on a VIN in the list 198 expands the listing to review the inspection related information and for an electronic signature to complete the certification. The create new tab 194 initiates an inspection process. Selection of the view open tab 196 creates a table with all open inspections that need to be completed allowing immediate access to information otherwise unavailable prior to the inventive system and method. Selection of the VIN search input field 200 prompts the dealer manager to select either to search for open inspections or for inspections waiting for dealer manager approval.

Figure 4D:
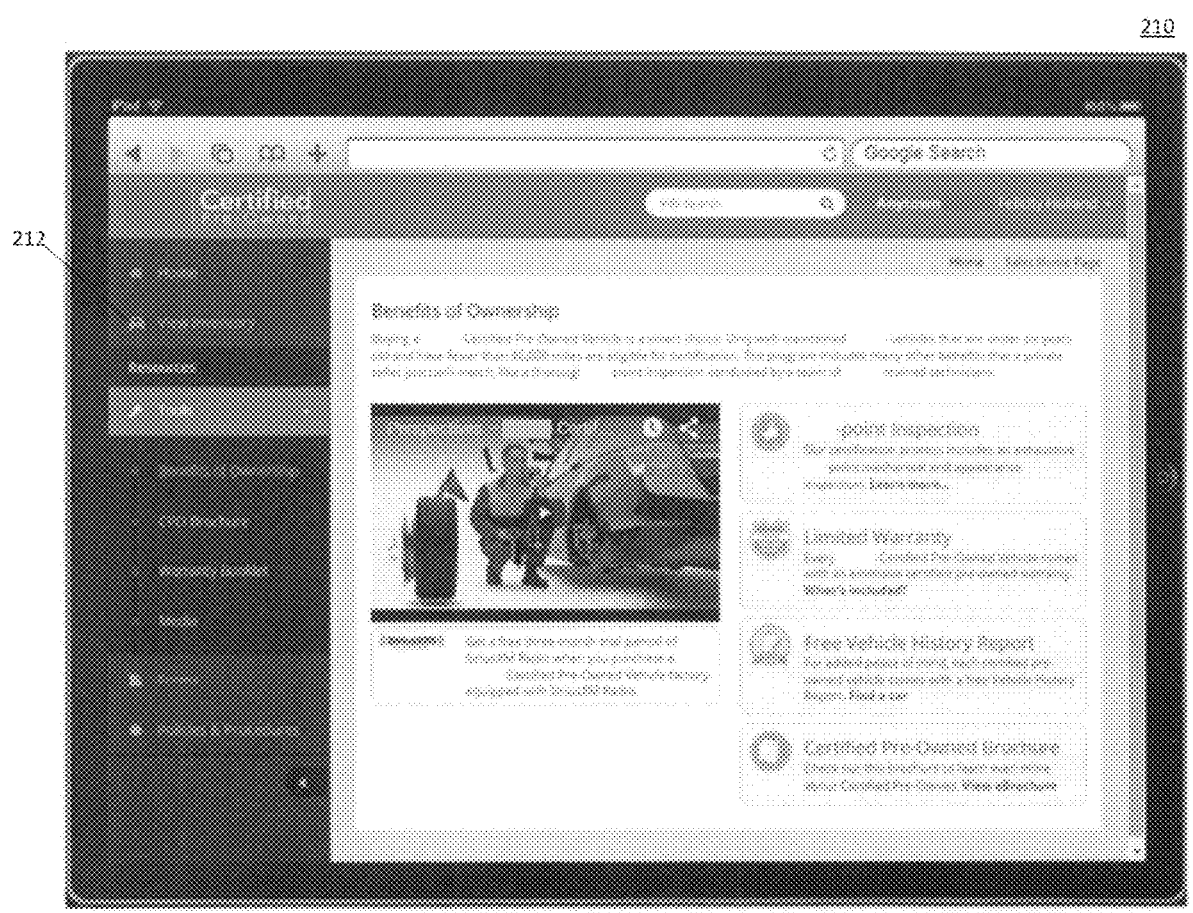
Figure 4E:
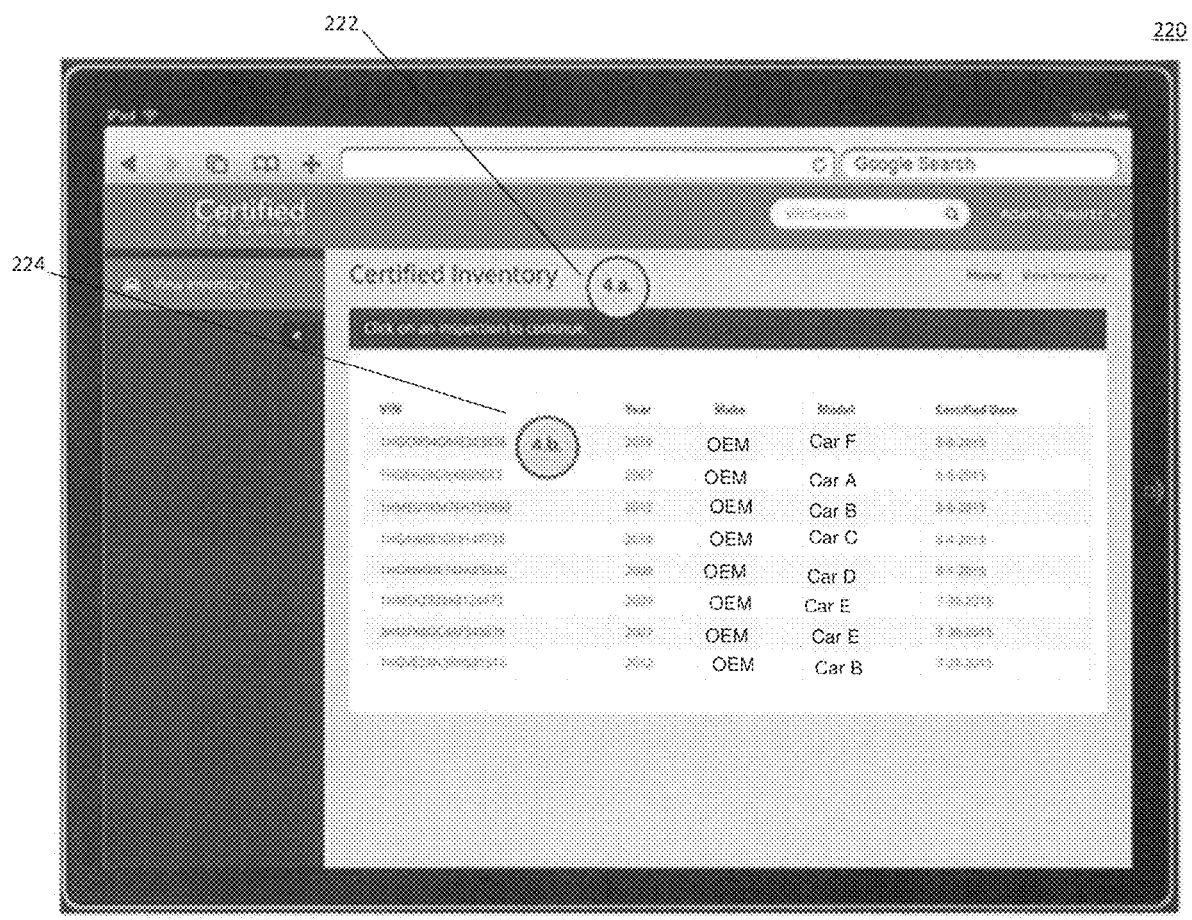
Figure 4F:
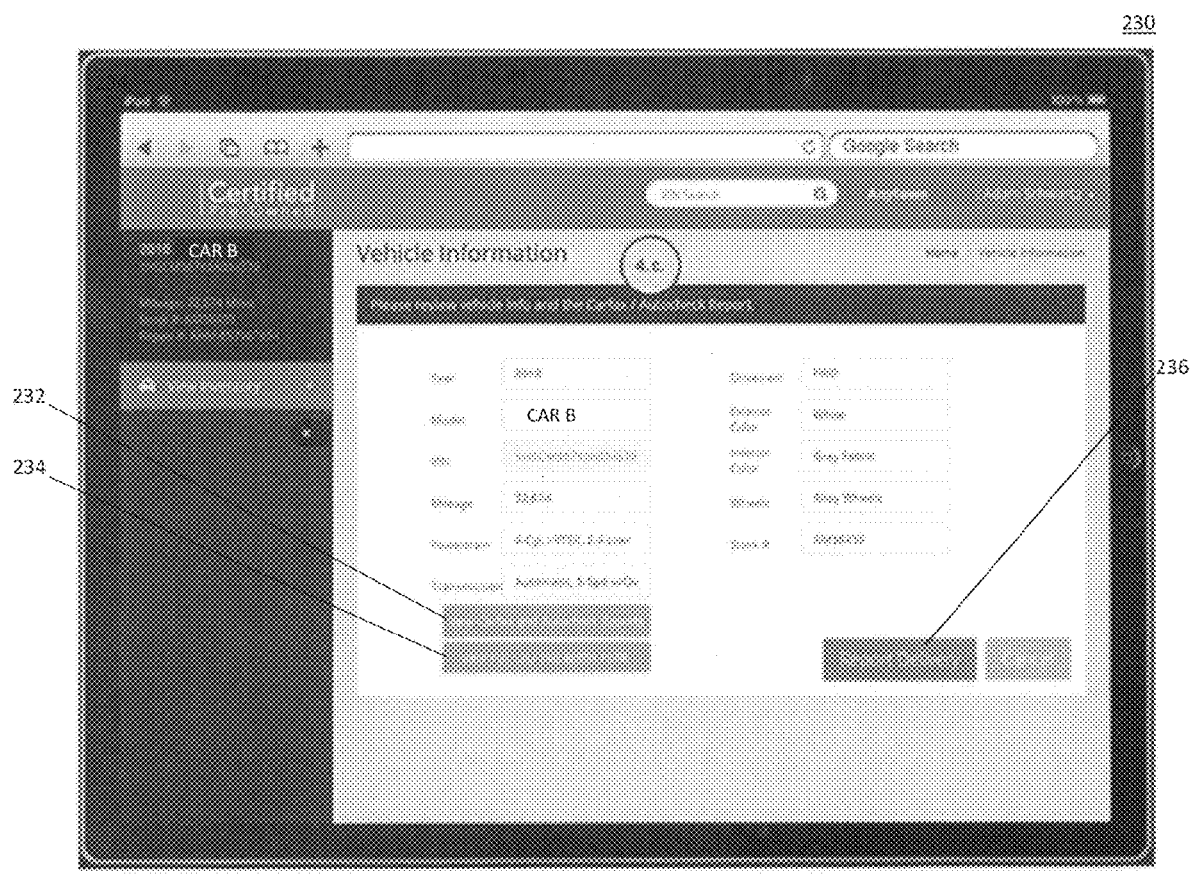
Figure 4G:
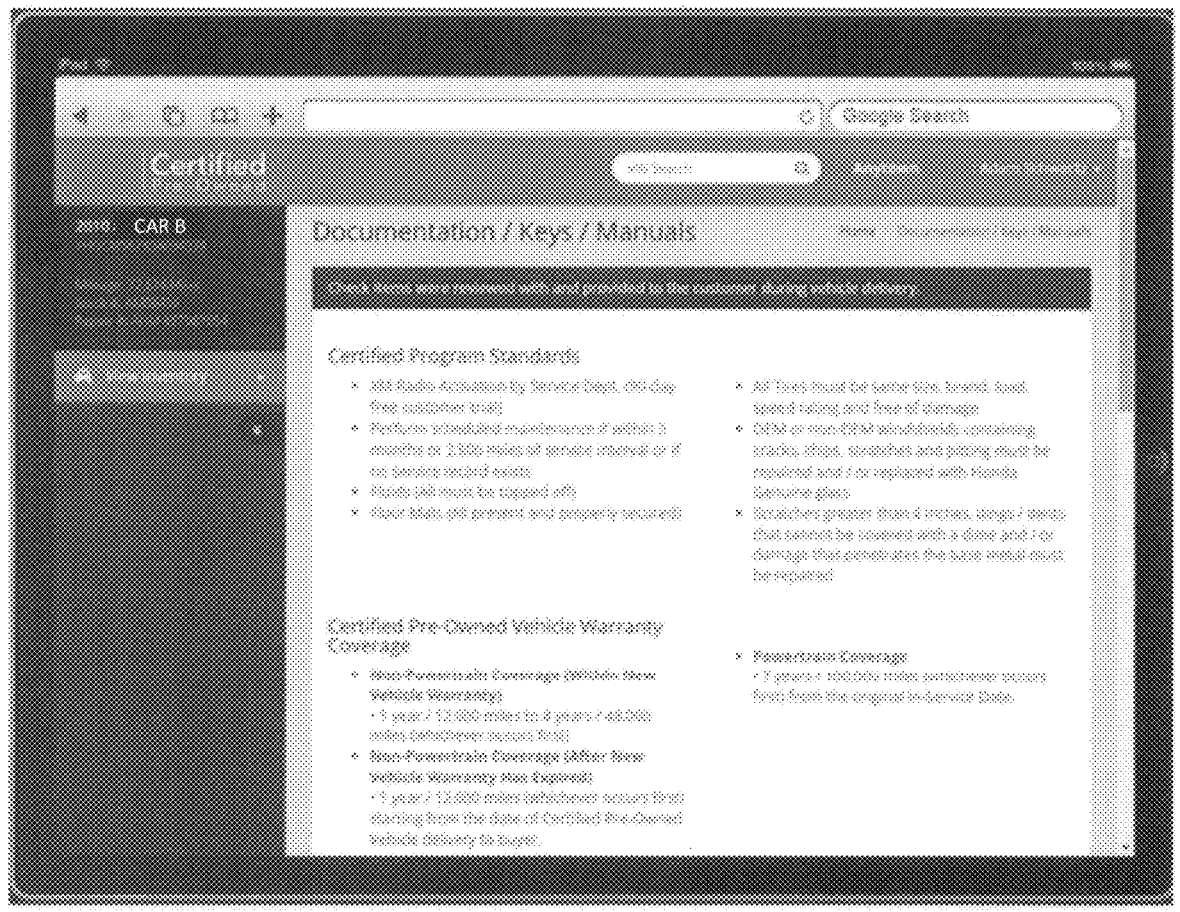
Figure 4H:
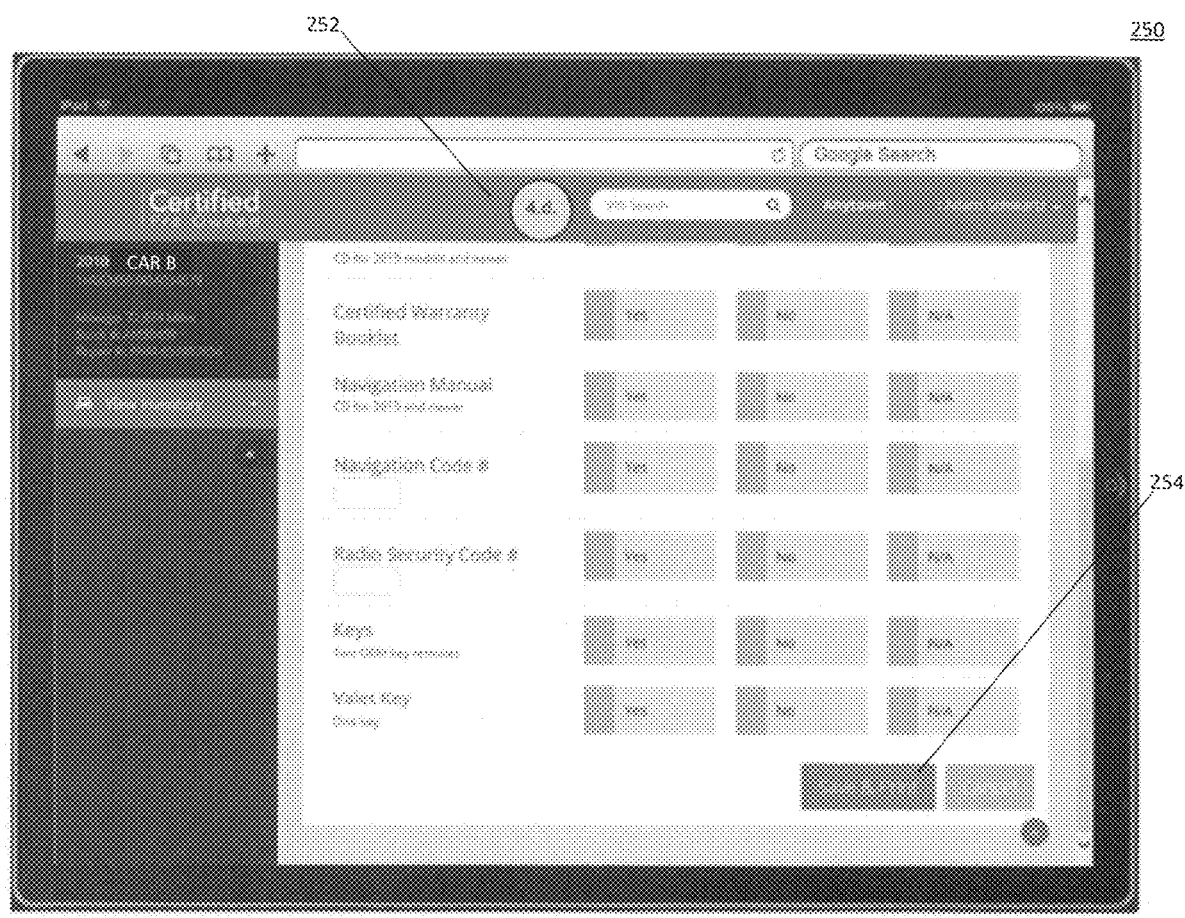

FIG. 4D shows a screen shot 210 of a sales consultant page with information about the certified pre-owned program, videos and various other items that can assist a sales consultant while working with a customer during the purchase process. Sales consultants are notified in real time when new documentation and sales aid become available via a web notification system. Selection of the view inventory tab 212 brings up the certified inventory screen 220 in FIG. 4E. The certified inventory screen displays a list 222 of all vehicles that have finished the certification process, thereby providing an accurate and real time list of vehicles available for sale, allowing inventory to be sold faster than ever before. The list may be sorted by year, make, and model, providing immediate and variable organization of information that is performed manually would require significant time and labor and would be error prone. Users also have the ability to filter the list based on year and model. Selection of a VIN 224 allows the user to download documentation for the selected vehicle including the inspection checklist (via tab 234), vehicle history report(s) (via tab 232), repairs completed/RO data, documentation provided by the manufacturer (OEM) as shown in the vehicle information screen 230 of FIG. 4F, thereby allowing access to all information relevant to a given vehicle in one centralized location available to users in different locations, which was never achieved manually. In addition, once a VIN is selected, the sales consultant has the ability to report the vehicle as sold and report vehicle delivery (RDR) via tab 236 to the interactive vendor network (IVN) of the OEM, thereby keeping the inventory list as up to date as possible. FIG. 4G is a documentation/keys/manual screen 240 that serves as a vehicle specific checklist of items reviewed with and provided to the customer during delivery, thereby reducing the likelihood of delivery errors as compared to a manually performed system and method. FIG. 4H is a screenshot 250 of a delivery pre-sale checklist 252 that the sales consultant uses to check off all of the items that have been provided to the customer. Once the sales consultant clicks the save & print button 254, the system will prompt the sales consultant to print various documents such as the certification checklist and the vehicle history reports. Next the customer will be asked to sign in the customer signature box. Once the customer signs the form, the vehicle delivery will be reported to IVN as delivered/sold.

Figure 4I:
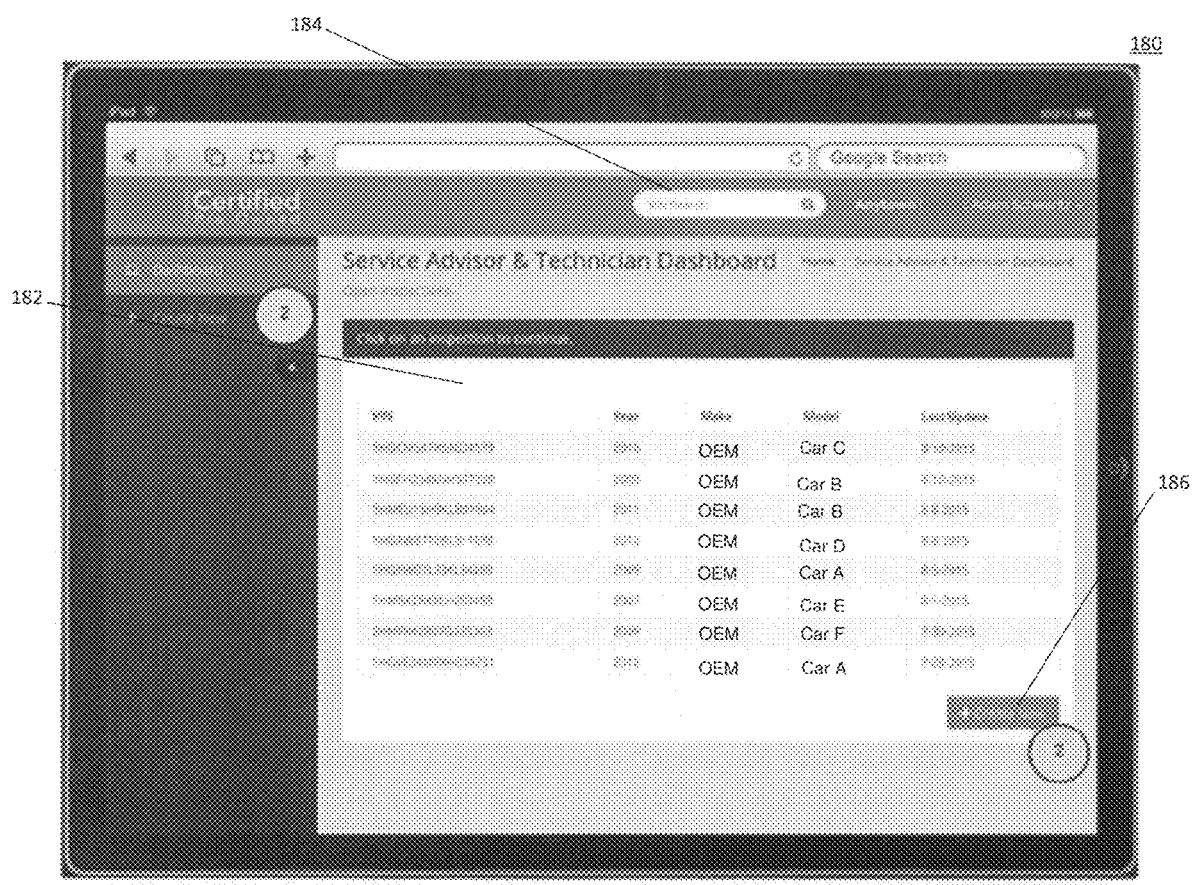
FIGS. 4I-4T are a series of screenshots of a graphical user interface showing the different screens involved in the inspection process in accordance with embodiments of the invention.
Figure 4J:
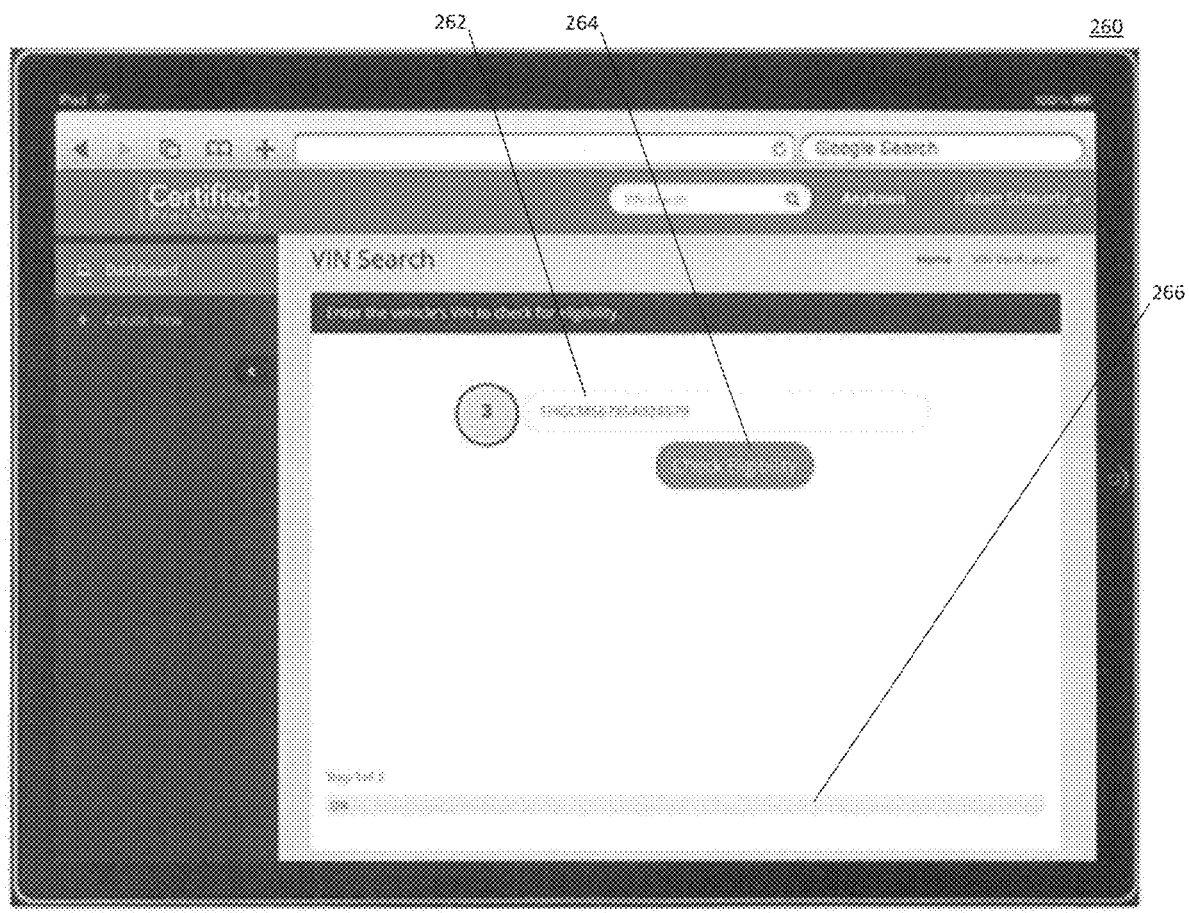
Figure 4K:
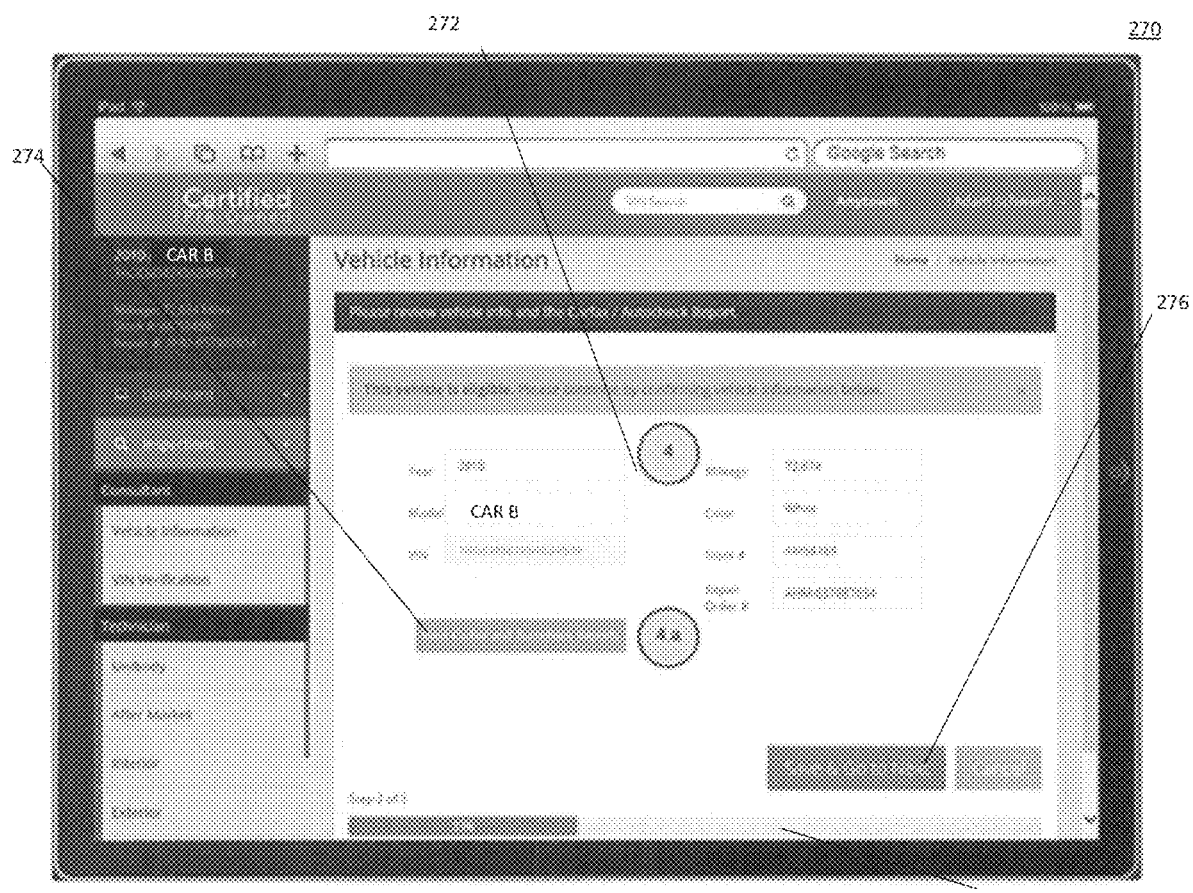
Figure 4L:
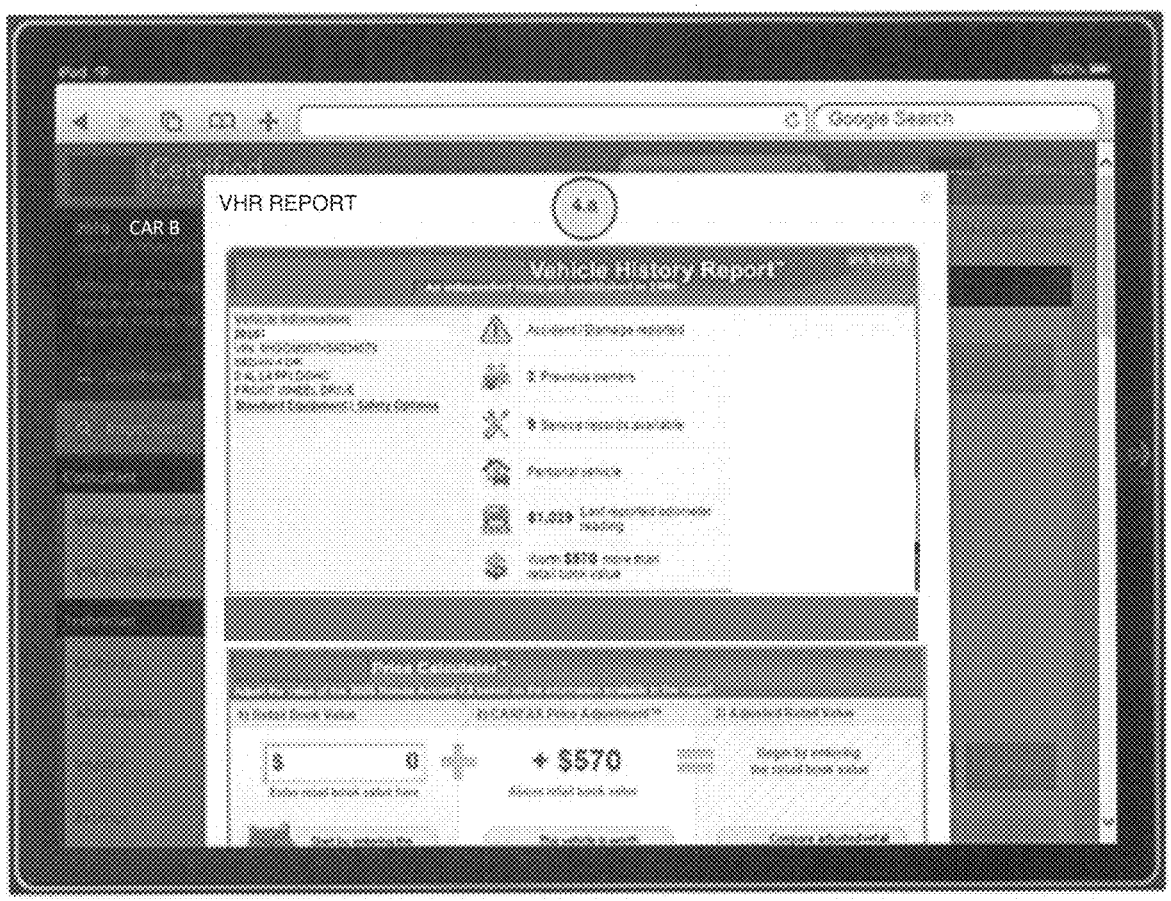
Figure 4M:
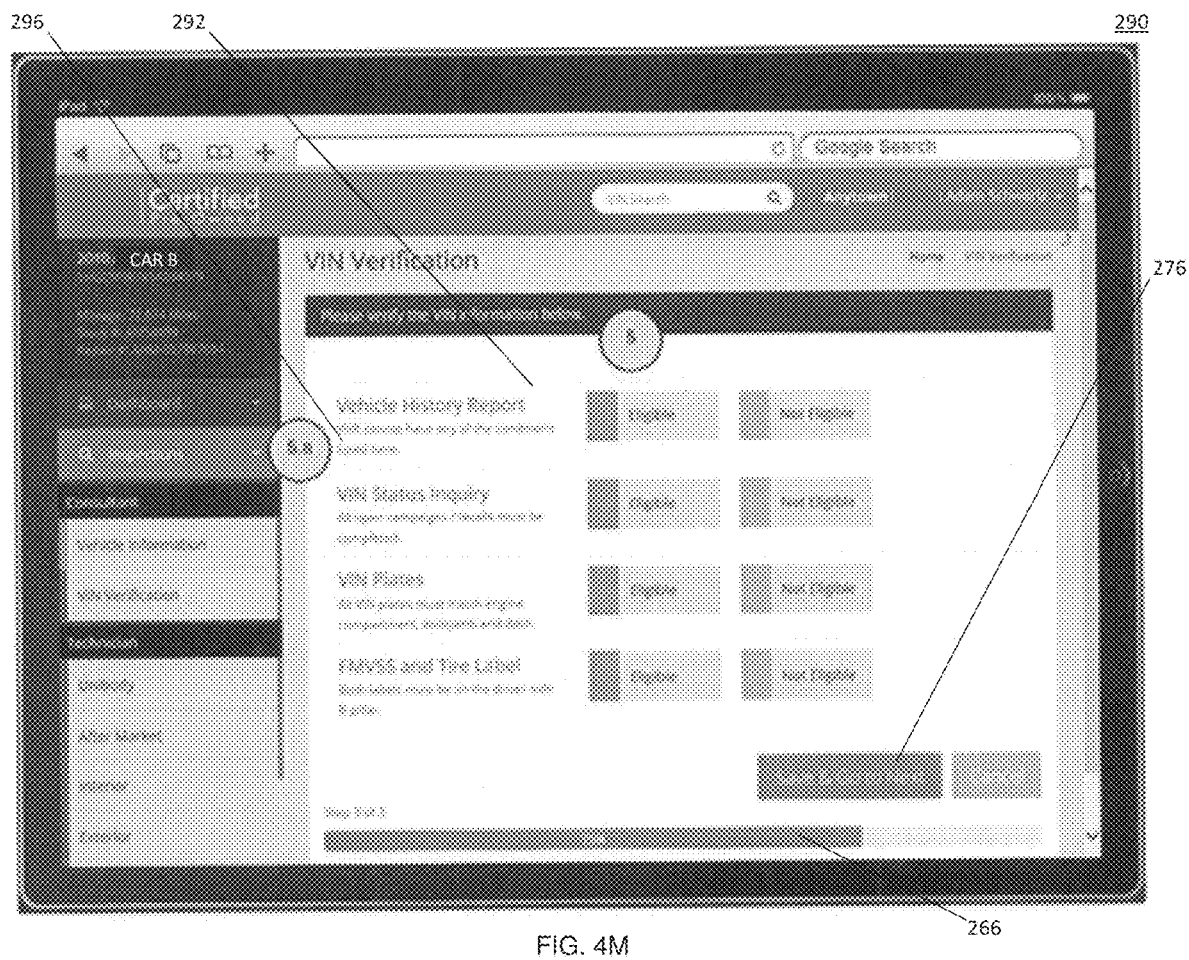
Figure 4N:
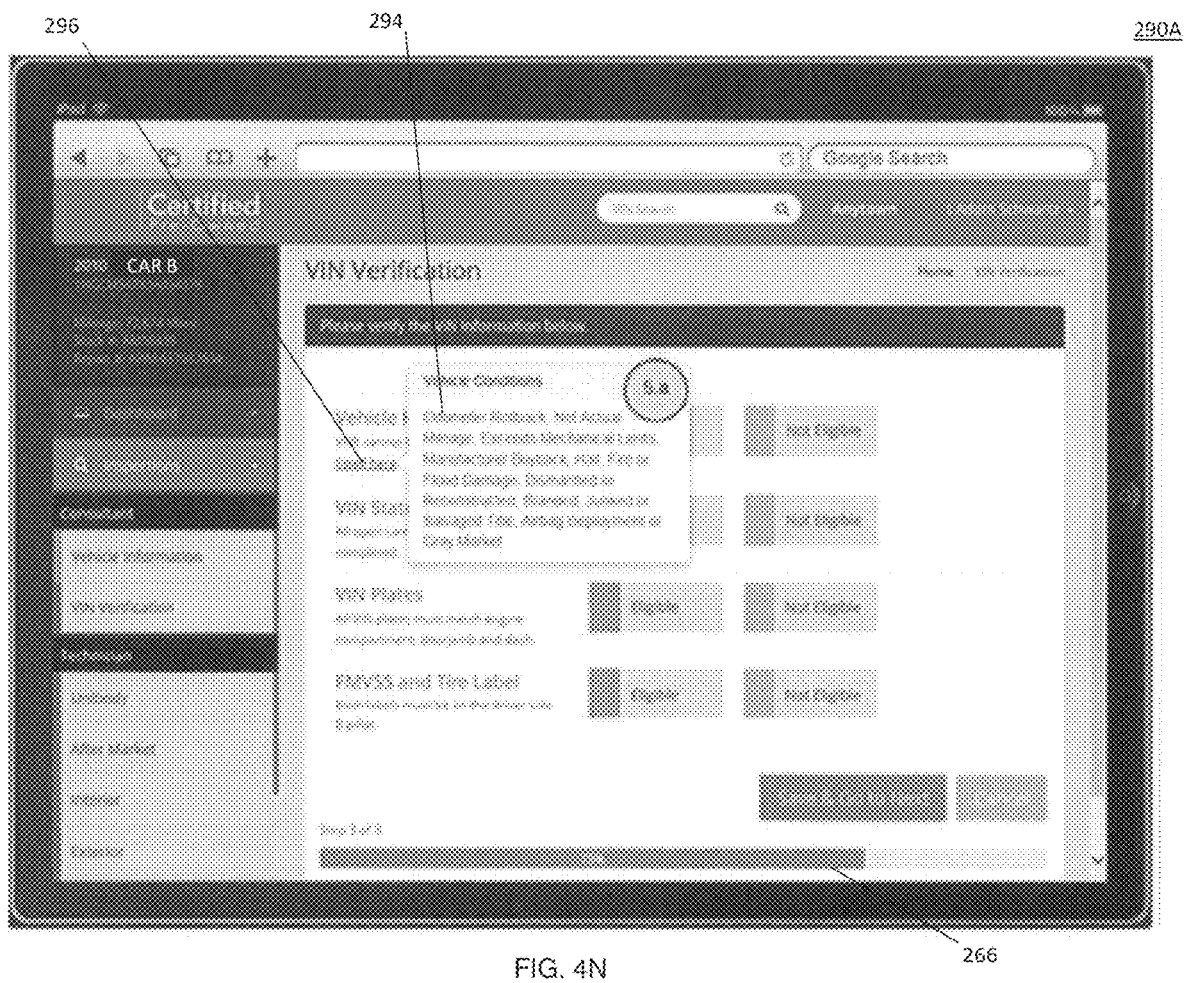
Figure 4O:
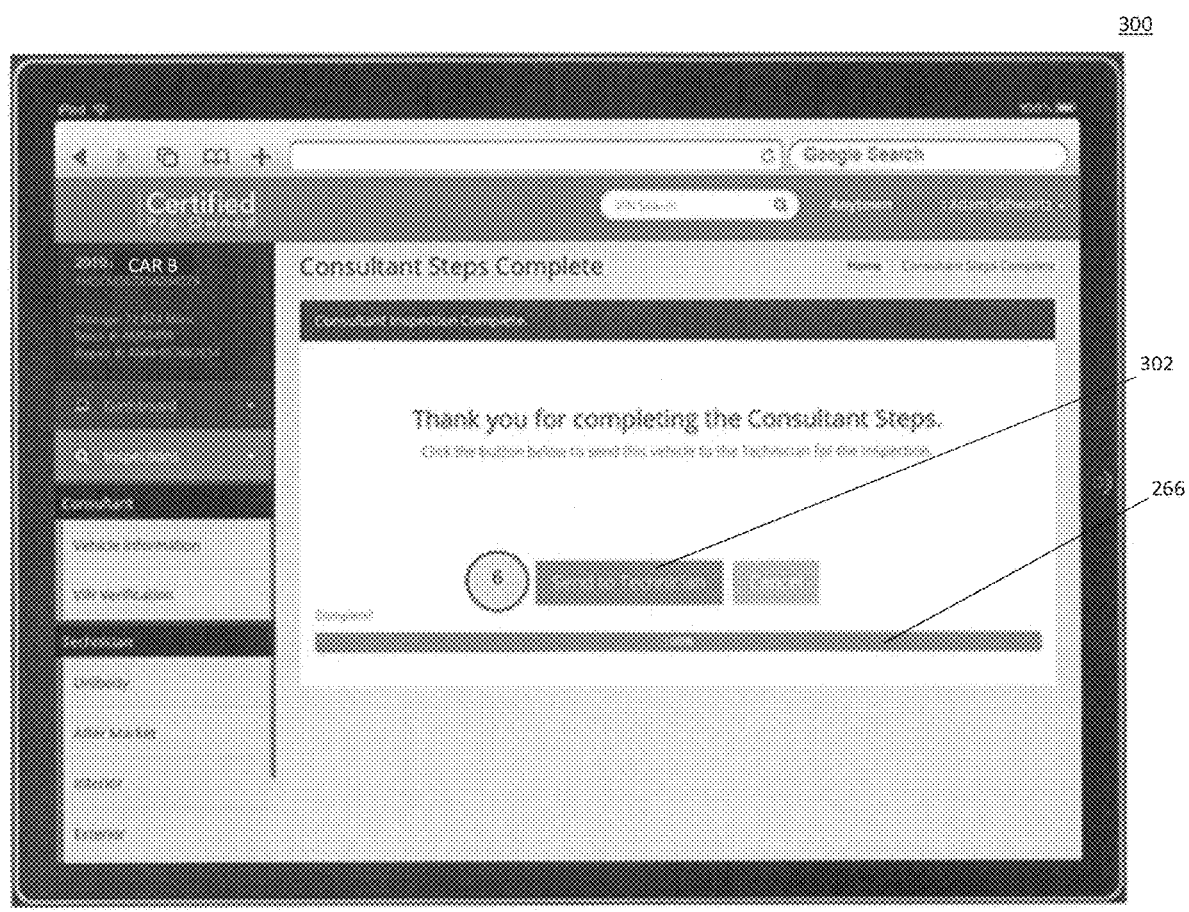
Figure 4P:
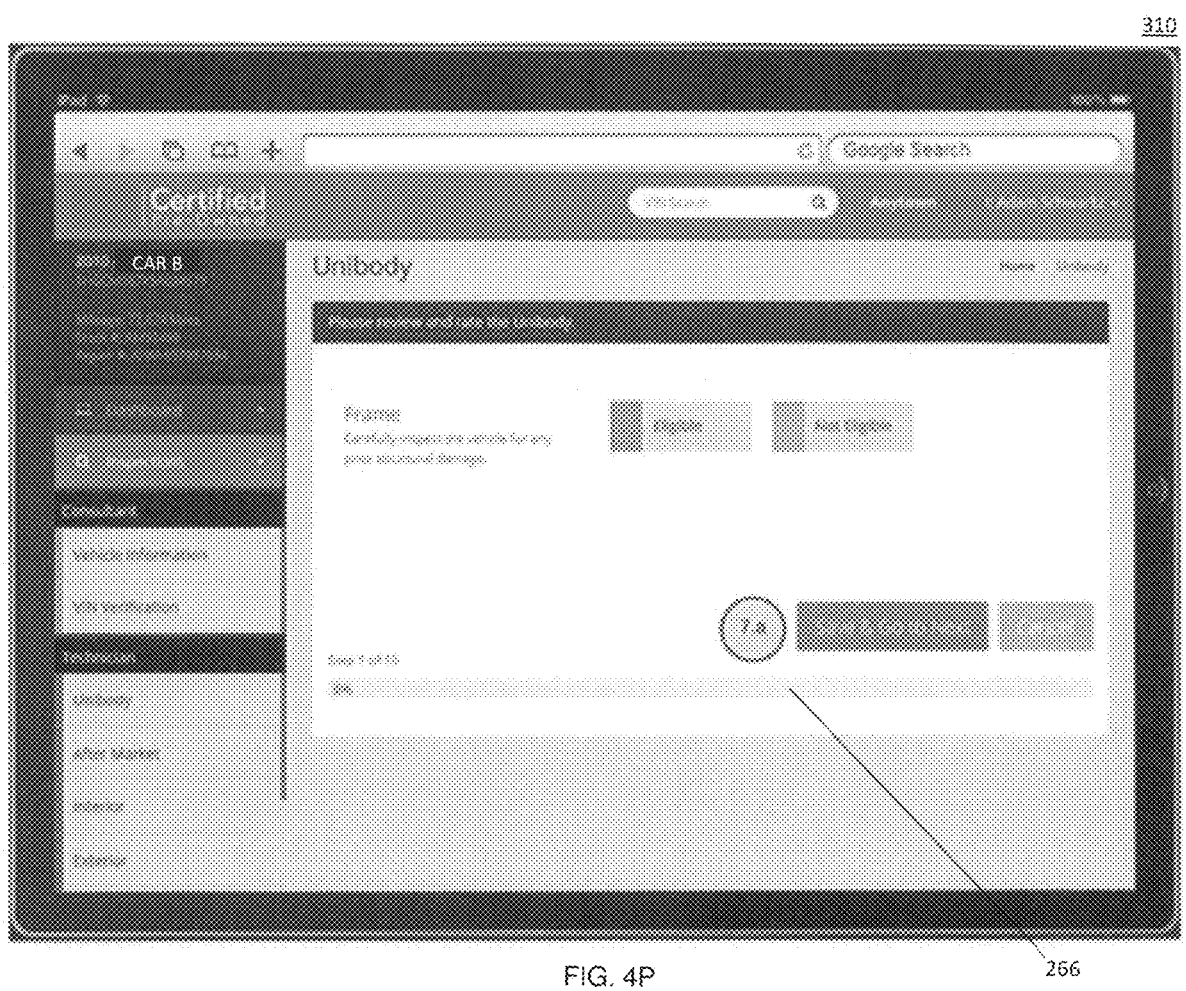
Figure 4Q:
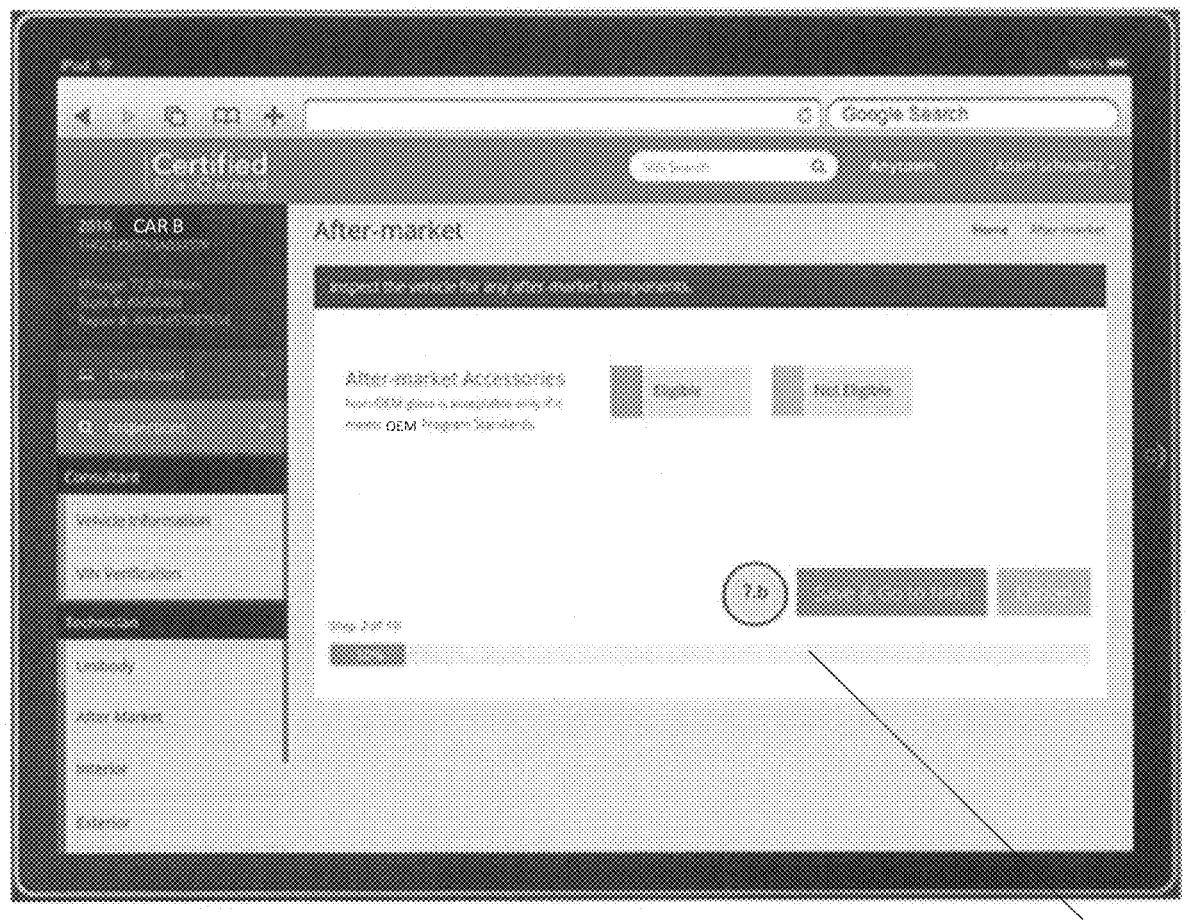
Figure 4R:
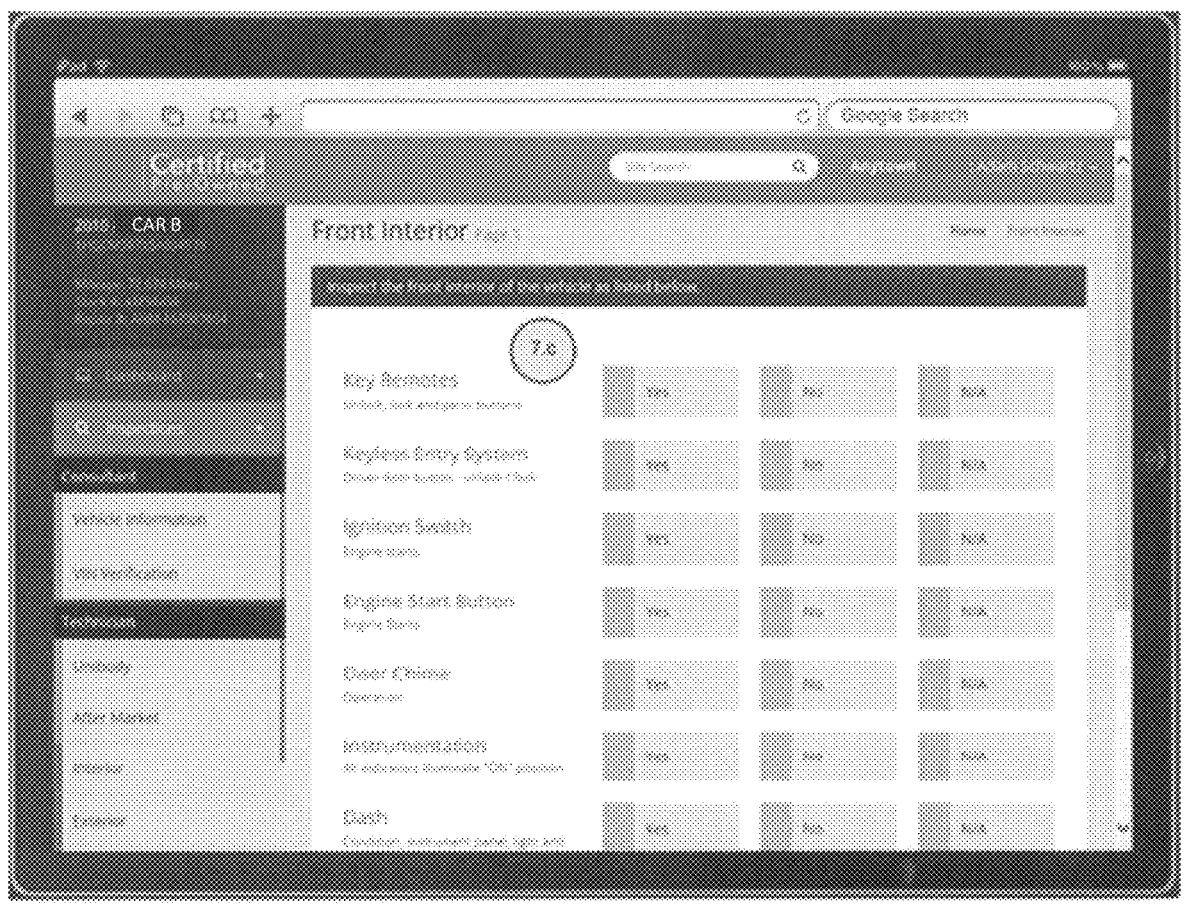
Figure 4S:
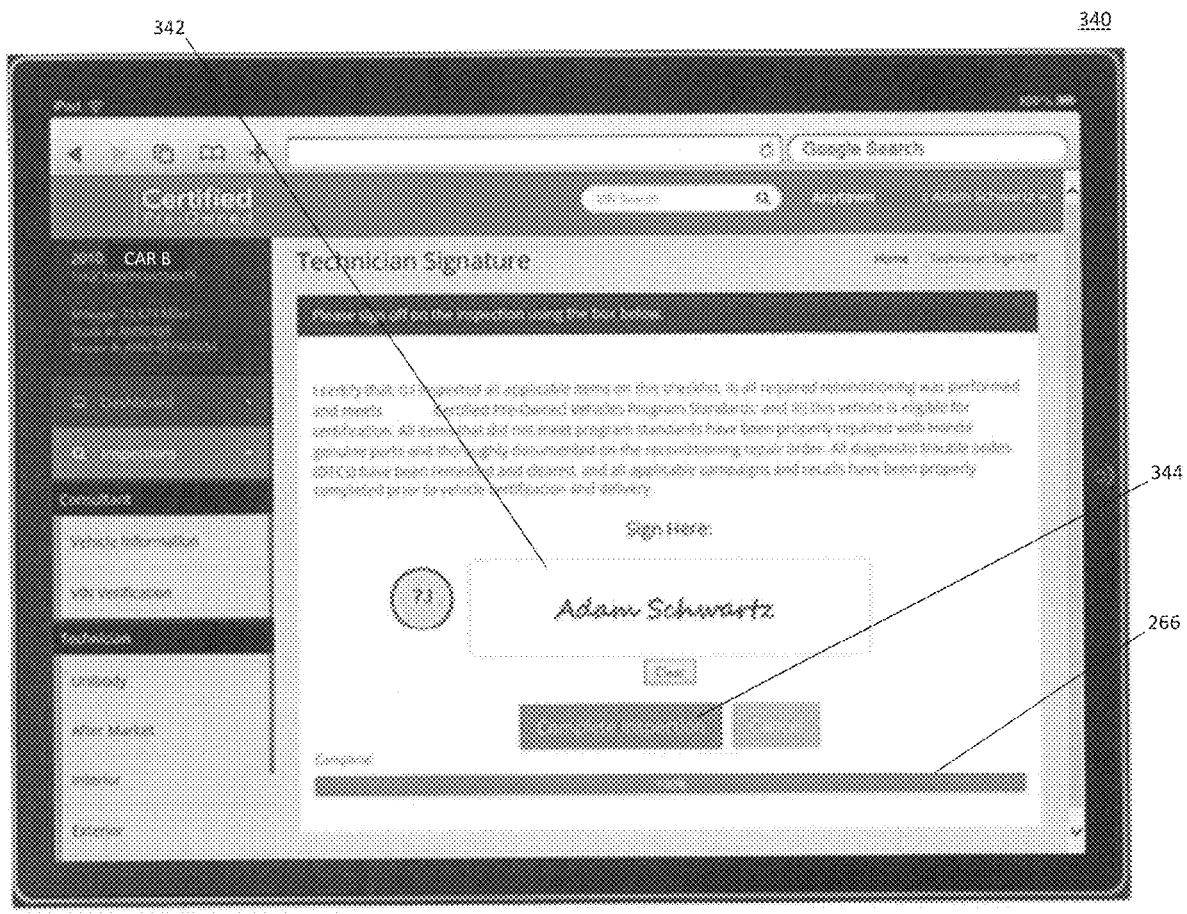

FIGS. 4I-4T are a series of screenshots of a graphical user interface showing the different screens involved in the inspection process. FIG. 4I also shown as FIG. 4B is a screenshot of an embodiment of the service advisors and technicians dashboard showing open inspections in a table 182 with fields for VIN, year, make, model, and last update. Users can resume an inspection by clicking on the VIN of the desired vehicle in the table 182. The VIN search input field 184 allows a user to search for a vehicle based on an inputted VIN and will only display results of a VIN that is currently part of an open inspection. The create new button 186 will start a new inspection process as is shown in greater detail below. Based on the VIN entered only inspection steps applicable to that vehicle will be displayed to the technician, creating vehicle specific inspection checklists for each individual vehicle, thereby ensuring time is not wasted by performing an inspection step that is not required for a given vehicle. Each step of the inspection process is saved upon completion, where the save also includes the time it took to complete the step as well as the user that completed the step, thereby creating valuable information and metrics not previously recorded without adding to the work load of the user and the time required to complete the task. Inspection steps may also be recorded with a camera function, where pictures are stored in the system attached to the inspection item. FIG. 4J is a VIN search screen used to check the eligibility of the vehicle to participate in a certified pre-owned program (CPO). The VIN is entered in field 262 and the users selects the check eligibility button 264. In response to the selection the VIN is sent to one or more independent vehicle history reporting agencies. If the vehicle has a clear title, is accident free, and has not been in a flood, the vehicle is generally considered eligible to be a CPO vehicle. If the VIN is deemed ineligible, the vehicle is marked as ineligible in the system and will be stored with all other ineligible vehicles, thereby reducing the likelihood that time will be wasted inspecting a vehicle that is ineligible. A status bar 266 shows the percentage of the process steps completed and is present in most of the following screens.

Once a vehicle is determined to be eligible, the user proceeds to the vehicle information screen in FIG. 4K to confirm the information on file about the vehicle. In addition, the user will enter the current mileage, color, stock #, and repair order # in fields 272. The year, model and VIN will be auto-populated based on the decoded VIN decode. Once the information has been entered, the user will click the VHR button 274 to view the vehicle history report (VHR) and then click "Save & Go to Next." button 276. Based on the information that is entered, the interactive vendor network (IVN) will determine if the vehicle is eligible. Recall information is captured from the IVN of the OEM, or if available from the reporting agency. An example screenshot 280 of a vehicle history report is shown in FIG. 4L. The user proceeds to a VIN verification screen 290 in FIG. 4M and is asked to verify the VHR, VIN status inquiry (recalls must be completed), VIN plates in the vehicle must match in door jambs, engine compartment, and car dashboard, and the federal motor vehicle safety standard (FMVSS) and tire label must be on the driver side B-pillar. The user marks these items as eligible or ineligible in fields 292. Following completion of the screen the user clicks the "Save & Go to Next." button 276 to proceed to the next step. FIG. 4N shows an information overlay 294 on VIN verification screen 290 that is accessed by clicking on a link 296. In this instance the overlay explains parameters in the VHR that would make a car ineligible for the CPO program. In addition, the system provides various tool tips and advice as needed for inspection items with extensive descriptions or conditions. Once the VIN verification items are all marked eligible, the user will be thanked for completing the consultant steps of the inspection on screen 300 of FIG. 4O, and the user will then click on the "Send to Technician." button 302. Once submitted, an alert (email/text) is sent in real time to the technicians, informing them that a vehicle for inspection is available. This will also generate an alert on the website. Such immediate notification enables inspection work to begin as soon as possible, thereby reducing wasted time and increasing vehicle turn over, which is a significant improvement over any manual notification previously performed.

FIGS. 4P-4T are technician level inspection screens showing sections of the inspection form. An embodiment of the inspection form has the following sections unibody, after-market accessories/modifications, front interior, technician signature, and the manager approval signature. FIG. 4P is a screenshot 310 of the unibody inspection form where the technician is asked to inspect the vehicle for any prior structural damage not disclosed in the VHR. If no damage is observed the technician checks the eligible box and clicks the save and go to next button.

Figure 4T:
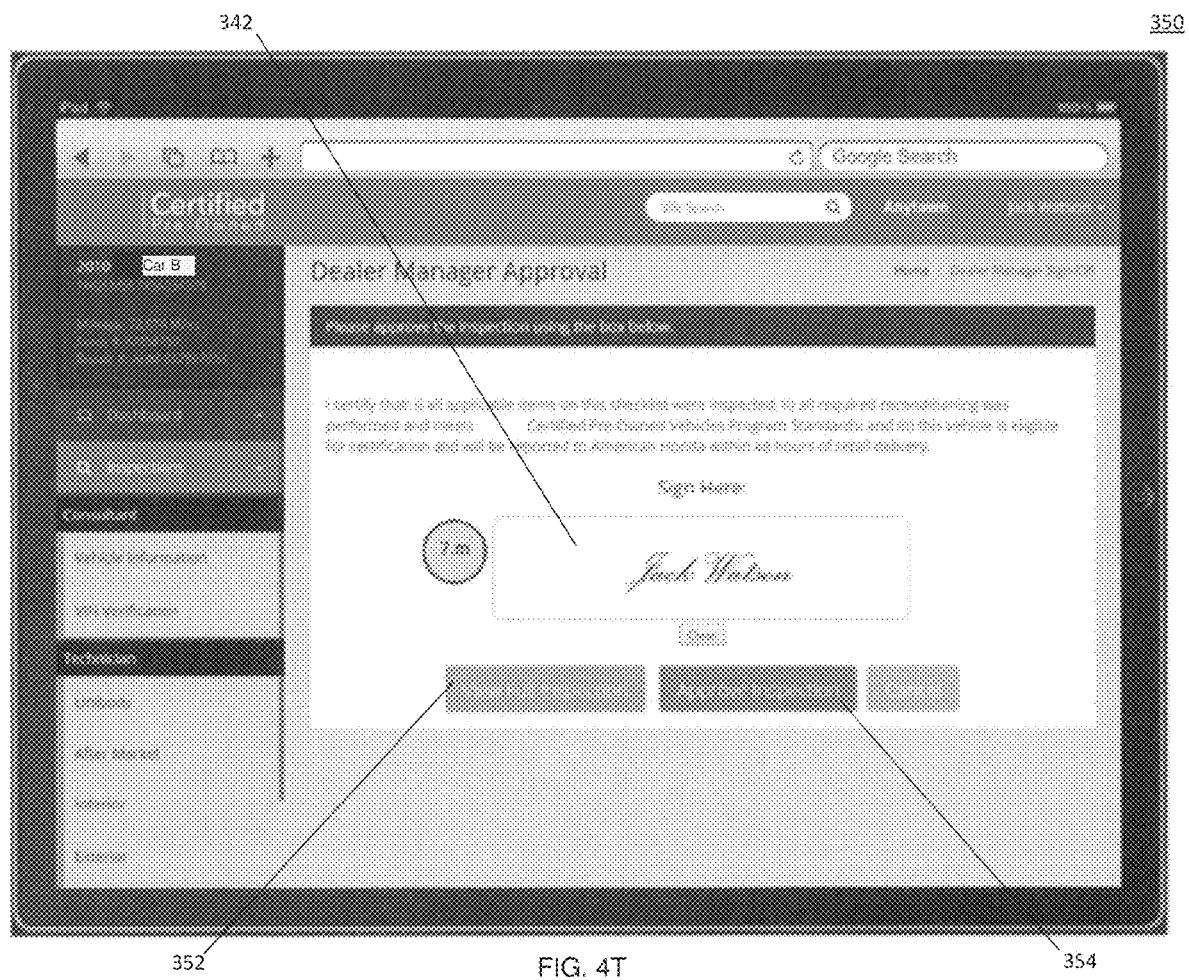

FIG. 4Q is a screenshot 320 of the after-market inspection form where the technician is asked to inspect the vehicle for any after-market parts or modifications to the vehicle. If there are no after-market parts the inspection may proceed to the next step in the inspection process. If there are after-market parts or modifications, the technician must confirm the parts or modifications meet the program standards of the certified pre-owned program before the vehicle is eligible. If the technician checks the eligible box and the save and go to next button, the inspection moves forward. FIG. 4R is an embodiment of a scrollable front interior inspection screen. The size of the front interior inspection requires the user to scroll down to complete the form. In an embodiment the screen scrolls down automatically as the user advances through the form. Additional on-screen inspection forms illustratively include rear interior, front exterior, rear exterior, under hood/fluids, under vehicle, brakes/wheels/tires, replacement items, and road test. FIG. 4S shows the technician sign-off screen with a signature entry field 342 and a complete inspection button 344. The technician's printed name and the signed date are captured by the system upon submission. In embodiments of the inventive platform, the inspection form is stored with the VIN so that it can be accessed, along with repair RO data will link so that repairs can be tracked. Once "Complete Inspection" is clicked, the system will send a real time alert to the dealer manager to let them now there is an inspection to approve again reducing down time for each vehicle during the inspection process. FIG. 4T is a screenshot 350 of a dealer manager sign-off screen. The dealer manager accesses and reviews the full inspection of the technician via button 352 and approves the inspection via button 354. The dealer manager is unable to approve the inspection unless they review the full inspection forms, ensuring a full and adequate review, which was not possible to ensure prior to the present inventive system and method. The dealer manager signs in signature box 342 and clicks the approval button 354. The dealer manager printed name and the signed date are captured by the system upon submission.

Figure 4U:
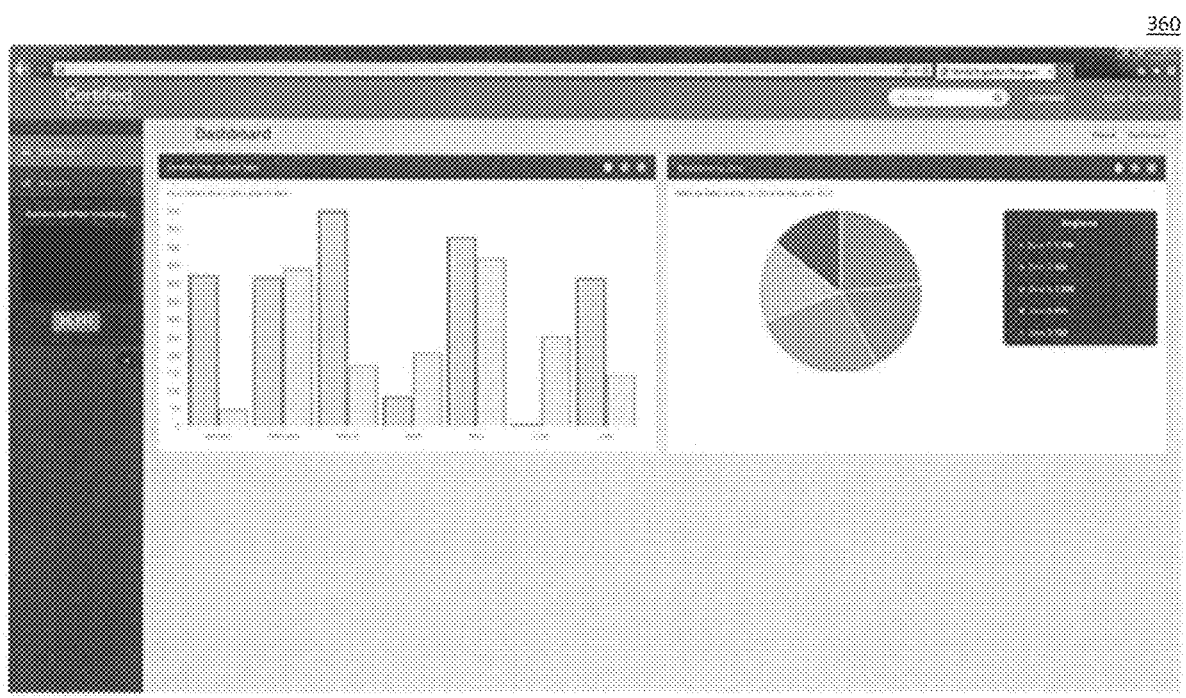
FIG. 4U is a screenshot of an embodiment of the corporate website.

FIG. 4U is a screenshot 360 of an embodiment of the corporate website. Users with access to the corporate reporting website will be able to access reports and a corporate dashboard where they can view the total number of certified vehicles nationally, by zone or by dealer, which is information not previously immediately available. The system will also track the amount of vehicles certified on a month to month basis. Furthermore, the dashboard based views of the corporate website allow corporate users to view program information in the form of highly-visual graphs and trend charts, thereby providing valuable program metrics otherwise unavailable prior to the inventive system and method. A statistical analysis module may be employed to analyze the data for tends and correlations. Embodiments of the corporate website also include access to certified documentation, certified Inventory, certified promotions, sales materials and promotions, and display media. Corporate users also have the ability to create and run custom reports that utilize all data that is collected inside of the inspection program. Examples of custom reports illustratively include cost of repairs, CPRO issues, user tracking, days in service, and days to turn (from start of an inspection to the date a vehicle is delivered to the customer (RDR'd).

Figure 4V:
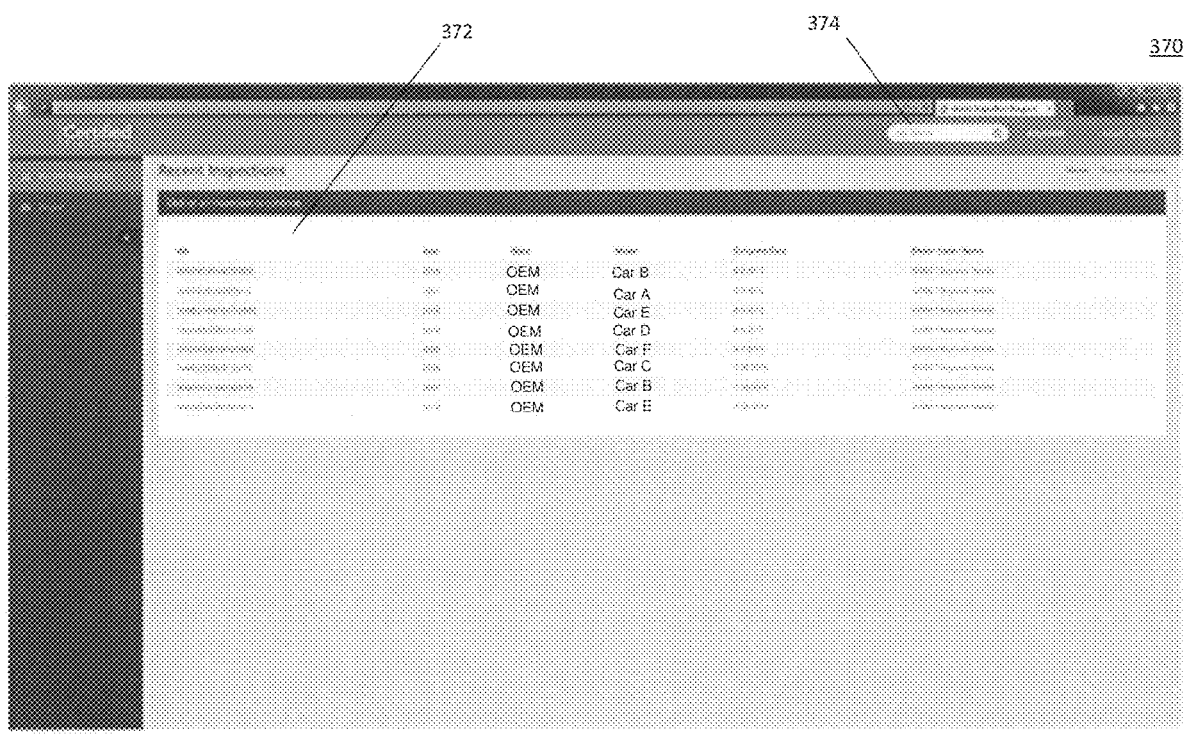
FIG. 4V is a screenshot of an embodiment of the auditor website.

FIG. 4V is a screenshot 370 of an embodiment of the auditor website that allow independent auditors to view all certified vehicles in the system. Auditors have access to all certified vehicles (and the appropriate documentation) that passed the inspection process and were approved by dealer management. Auditors may select a specific VIN in a table of recent inspections 372 to view an inspection form. The VIN search 374 allows the auditor to find a specific vehicle.

Figure 5:
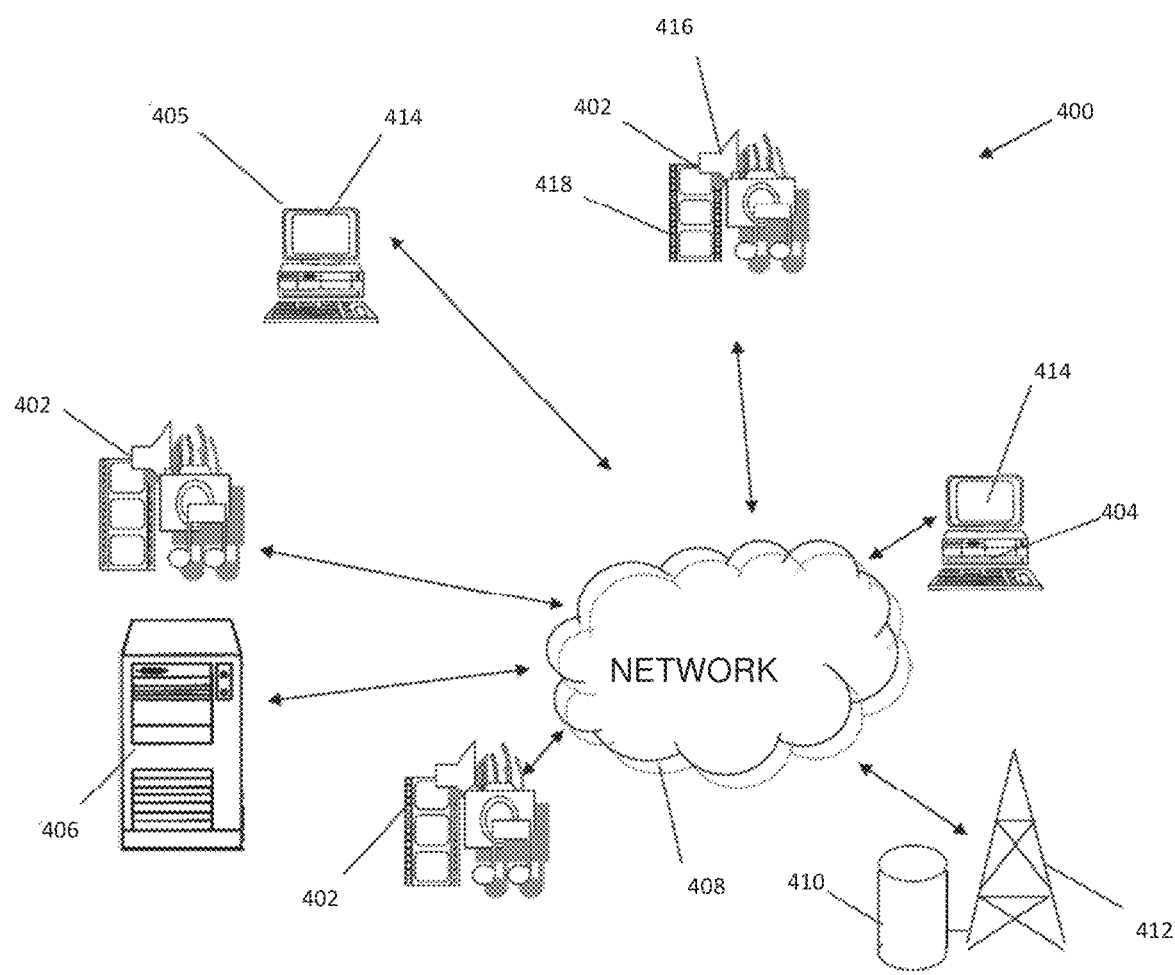
FIG. 5 is a schematic diagram illustrating an overall view of communication devices, computing devices, and mediums for implementing embodiments of the invention.

FIG. 5 is a schematic diagram illustrating an overall view of communication devices, computing devices, and mediums for implementing a system and method for certifying pre-owned vehicles and equipment.

The system 400 includes multimedia devices 402 and desktop computer devices 404 configured with display capabilities 414 and processors for executing instructions and commands, as well as running software and apps. The multimedia devices 402 are optionally mobile communication and entertainment devices, such as cellular phones, tablets, laptops, and mobile computing devices that in certain embodiments are wirelessly connected to a network 408. The multimedia devices 402 typically have video displays 418 and audio outputs 416. The multimedia devices 402 and desktop computer devices 404 are optionally configured with internal storage, software, and a graphical user interface (GUI) for carrying out elements of the certified pre-owned system and method according to embodiments of the invention. The network 408 is optionally any type of known network including a fixed wire line network, cable and fiber optics, over the air broadcasts, local area network (LAN), wide area network (WAN), global network (e.g., Internet), intranet, etc. with data/Internet capabilities as represented by server 406. Communication aspects of the network are represented by cellular base station 410 and antenna 412. In a preferred embodiment, the network 408 is a LAN and each remote device 402 and desktop device 404 executes a user interface application (e.g., Web browser) to contact the server system 406 through the network 408. Alternatively, the remote devices 402 and 404 may be implemented using a device programmed primarily for accessing network 408 such as a remote client.

The software for the system and method for certifying pre-owned vehicles and equipment of embodiments of the invention may be resident on tablets 402, desktop or laptop computers 404, or stored within the server 406 or cellular base station 410 for download to an end user. Server 406 may be implemented as a cloud-based service for implementing embodiments of the platform with a multi-tenant database for storage of separate client data for each independent original equipment manufacturer.

As a person skilled in the art will recognize from the previous detailed description and from the figures and claims, modifications and changes can be made to the preferred embodiments of the invention without departing from the scope of this invention defined in the following claims.

The invention claimed is:

1. A non-transitory computer-readable medium for certifying pre-owned vehicles, comprising instructions stored thereon, that when executed on a processor, perform the steps of:

generating a first graphical user interface (GUI) on a-device;
receiving a vehicle identification number (VIN) or vehicle identifier via the first GUI on the device;
checking the VIN or vehicle identifier for eligibility of the vehicle to participate in a certified pre-owned program;
wherein if the VIN or vehicle identifier is eligible to participate in the certified pre-owned program:
sending the VIN or vehicle identifier to one or more vehicle history reporting agencies;
receiving a vehicle history report (VHR) from the one or more vehicle history reporting agencies related to the VIN or vehicle identifier;
analyzing the VHR for eligibility of the vehicle to participate in a certified pre-owned program;
wherein if the VHR renders the vehicle eligible to participate in the certified pre-owned program:
generating on screen inspection forms, certification checklists, or a combination thereof that are populated with items specific to the VIN or vehicle identifier and certification program requirements;
providing a generated inspection form notification on the device inclusive of inspection and reconditioning required on the vehicle;
generating a digital certification based on user generated responses that conform to preprogrammed guidelines or standards of the certified pre-owned program;
generating a second GUI the second GUI providing real time information as to at least one of: total number of vehicles that have been certified in a current calendar year, a total number of current certified vehicles or a total amount of open inspections;
providing a plurality of tabs on the second GUI in a first region of the second GUI that upon selection allow the user to view data in real time in a second region of the second GUI, as to open inspections, completed inspections, or a combination thereof that have been inputted on the first GUI, the data in one of at least two visual forms.

2. The non-transitory computer-readable medium of claim 1 wherein the user generated responses are recorded in a database with searchable variables.

3. The non-transitory computer-readable medium of claim 1 further comprising generating reports based on statistical analysis.

4. The non-transitory computer-readable medium of claim 3 wherein the generated reports are password protected and only available to authorized personnel.

5. The non-transitory computer-readable medium of claim 1 wherein at least one of the first or second GUIs generates on screen prompts and other GUI features that are touch activated via a touchscreen of the device.

6. The non-transitory computer-readable medium of claim 1 further comprising on-screen sign-off screens to approve the vehicle inspection or the certification.

7. The non-transitory computer-readable medium of claim 1 further comprising:
receiving, in response to screen prompts, the user generated responses input to the inspection forms or certification checklists via the first GUI;
providing access to the VHR and user generated responses to the inspection forms or certification checklists; and
receiving certification approval.

8. The non-transitory computer-readable medium of claim 1 further comprising generating a sales consultant GUI and providing access to certified pre-owned marketing materials on the sale consultant GUI.

9. An automated method for certifying pre-owned vehicles, said method comprising:
providing a technician graphical user interface (GUI) on a portable computing device;
generating a login page on a display of the portable computing device;
receiving a stakeholder's credentials for login;
receiving a vehicle identification number (VIN) via the technician GUI on the portable computing device;
decoding the VIN;
checking the VIN against a database of vehicles for eligibility of the vehicle to participate in a certified pre-owned program;
wherein if the VIN is eligible to participate in the certified pre-owned program:
sending the VIN to one or more vehicle history reporting agencies;
receiving a vehicle history report (VHR) from the one or more vehicle history reporting agencies related to the VIN;
analyzing the VHR for eligibility of the vehicle to participate in a certified pre-owned program;
wherein if the VHR renders the vehicle eligible to participate in the certified pre-owned program:
generating on screen inspection forms and certification checklists that are automatically populated with only items specific to the VIN and certification program requirements;
providing a generated inspection form notification on the first portable computing device inclusive of inspection and reconditioning required on the vehicle;
receiving, in response to screen prompts, user generated responses input to the inspection forms via the technician GUI on the first portable computing device;
providing access to the VHR, user generated responses to the inspection forms, and certification checklists via a manager GUI;
receiving certification approval via the manager GUI;
sending the VIN to a database of certified pre-owned vehicles and listing the vehicle in an inventory of certified pre-owned vehicles;
generating a digital certification based on the generated responses that conform to preprogrammed guidelines or standards of the certified pre-owned program;
generating an administrator GUI, the administrator GUI providing real time information as to at least one of: total number of vehicles that have been certified in a current calendar year, a total number of current certified vehicles or a total amount of open inspections;
providing a plurality of tabs on the administrator GUI in a first region of the administrator GUI that upon selection allows the user to view data in real time in a second region of the administrator GUI as to open inspections and completed inspections that have been inputted in at least one of the technician GUI and the manager GUI, the data for each of the technician GUI and the manager GUI, in one of at least two visual forms.

10. The method of claim 9 wherein the user generated responses are recorded in a database with searchable variables.

11. The method of claim 9 further comprising generating reports based on a statistical analysis.

12. The method of claim 11 wherein the generated reports are password protected and only available to authorized personnel.

13. The method of claim 9 wherein the on screen inspection forms further comprise at least one of: after-market inspection, front interior inspection, rear interior, front exterior, rear exterior, under hood/fluids, under vehicle, brakes/wheels/tires, replacement items, and road test.

14. The method of claim 9 further comprising on-screen sign-off screens to approve the vehicle inspection or the certification.

15. The method of claim 9 wherein the technician GUI and the manager GUI are displayed on different devices.

16. The method of claim 15 wherein the manager GUI and the administrator GUI are displayed on different devices.

17. A system for certifying pre-owned vehicles, said system comprising:
a server with a database connected via a network to one or more portable computing devices located at vehicle dealer locations;
a memory system in electrical communication with said server containing a machine readable medium having stored thereon one or more sequences of instructions which, when executed by a processor, cause a method to be carried out, the method comprising:
providing a sales employee graphical user interface (GUI);
receiving a vehicle identification number (VIN) via the sales employee GUI;
receiving an inspection task assignment input via a manager GUI to assign the inspection task to a technician;
displaying the assigned inspection task on a technician GUI;
generating on screen inspection forms and certification checklists that are automatically populated with items specific to the VIN and certification program requirements inclusive of inspection and reconditioning required on the vehicle;
receiving, in response to screen prompts, user generated responses input to the inspection forms via the technician GUI;
providing an alert to the portable computing device for certification authorization;
providing access to user generated responses to the inspection forms and certification checklists via the manager GUI;
receiving certification approval via the manager GUI;
sending the VIN to a database of certified pre-owned vehicles and listing the vehicle in an inventory of certified pre-owned vehicles;
generating a digital certification based on the generated responses that conform to preprogrammed guidelines or standards of the certified pre-owned program;
providing access to the inventory of certified pre-owned vehicles and the digital certification;
generating an administrator GUI, said administrator GUI providing real time information as to at least one of: total number of vehicles that have been certified in a current calendar year, a total number of current certified vehicles or a total amount of open inspections;
providing a plurality of tabs on the administrator GUI that in a first region of the administrator GUI-upon selection allows the user to select to view data in real time in a second region of the GUI as to open inspections and completed inspections that have been inputted by at least two of the technician GUI, and the manager GUI, the data for each of the technician GUI, and the manager GUI, in one of at least two visual forms.

18. The system of claim 17 wherein the user generated responses are recorded in a database with searchable variables.

19. The system of claim 17 further comprising a report generator configured to generate reports based on a statistical analysis.

20. The system of claim 19 wherein the generated reports are password protected and only available to authorized personnel.

21. The system of claim 17 further comprising on-screen sign-off screens to approve vehicle inspection and certification.

22. The system of claim 17 further comprising a sales consultation GUI displaying at least a portion of the data generated by the technician GUI.

* * * * *